(12) United States Patent
Zhu et al.

(10) Patent No.: US 9,722,873 B2
(45) Date of Patent: Aug. 1, 2017

(54) ZERO-DOWNTIME, REVERSIBLE, CLIENT-DRIVEN SERVICE MIGRATION

(71) Applicant: Microsoft Technology Licensing, LLC, Redmond, WA (US)

(72) Inventors: Kai Zhu, Sammamish, WA (US); Burra Gopal, Bellevue, WA (US); Zhongqin Wu, Sammamish, WA (US); Darell Macatangay, Redmond, WA (US); Roberto Taboada, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 14/561,175

(22) Filed: Dec. 4, 2014

(65) Prior Publication Data

US 2016/0164722 A1    Jun. 9, 2016

(51) Int. Cl.
| | | |
|---|---|---|
| *G06F 15/177* | (2006.01) | |
| *H04L 12/24* | (2006.01) | |
| *H04L 29/08* | (2006.01) | |
| *G06F 17/30* | (2006.01) | |
| *H04L 29/06* | (2006.01) | |

(52) U.S. Cl.
CPC ...... *H04L 41/082* (2013.01); *G06F 17/30575* (2013.01); *H04L 41/5041* (2013.01); *H04L 67/02* (2013.01); *H04L 67/1095* (2013.01); *H04L 67/16* (2013.01); *H04L 67/34* (2013.01); *H04L 67/42* (2013.01); *H04L 41/5096* (2013.01)

(58) Field of Classification Search
CPC .......... G06F 17/30575; H04L 67/1095; H04L 67/16; H04L 41/5041; H04L 41/5096
USPC ...................................................... 709/221
See application file for complete search history.

(56) References Cited

U.S. PATENT DOCUMENTS

| | | | |
|---|---|---|---|
| 7,155,462 B1 | 12/2006 | Singh et al. | |
| 7,313,792 B2 | 12/2007 | Buban et al. | |
| 7,861,239 B2 | 12/2010 | Mayfield et al. | |
| 8,099,727 B2 | 1/2012 | Bahat et al. | |
| 8,200,634 B2 | 6/2012 | Driesen et al. | |
| 8,453,145 B1 | 5/2013 | Naik | |
| 2007/0011266 A1* | 1/2007 | Anderson | G06F 9/542 709/217 |
| 2009/0276771 A1* | 11/2009 | Nickolov | G06F 9/4856 717/177 |
| 2010/0242032 A1 | 9/2010 | Ladki et al. | |
| 2012/0331260 A1* | 12/2012 | Arroyo | G06F 13/28 711/206 |
| 2014/0013315 A1 | 1/2014 | Genevski et al. | |
| 2014/0033188 A1 | 1/2014 | Beavers et al. | |
| 2014/0082059 A1 | 3/2014 | Das et al. | |
| 2014/0089457 A1 | 3/2014 | Ohrstrom-Sandgren et al. | |

\* cited by examiner

Primary Examiner — Tauqir Hussain

(57) ABSTRACT

A computer system may provide zero-downtime, reversible, client-driven service migration to migrate a client from a current service to a new service. The computer system may configure the client to operate in a dual-write, old-read mode in which the client issues write requests to both the current service and the new service and issues read requests only to the current service. The computer system may configure the client to operate in a dual-write, new-read mode in which the client issues write requests to both the current service and the new service and issues read requests only to the new service.

20 Claims, 8 Drawing Sheets

ZERO-DOWNTIME, REVERSIBLE, CLIENT-DRIVEN SERVICE MIGRATION

BACKGROUND

A cloud platform may provide cloud-based services for managing and storing customer data. For example, a cloud platform may host a database that stores customer data and a cloud-based service for managing the customer data. When the cloud-based service evolves from a current version to a new version, customers may be migrated from the current version of the cloud-based service to the new version of the cloud-based service.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computer system may provide zero-downtime, reversible, client-driven service migration to migrate a client from a current service to a new service. The computer system may configure the client to operate in a dual-write, old-read mode in which the client issues write requests to both the current service and the new service and issues read requests only to the current service. The computer system may configure the client to operate in a dual-write, new-read mode in which the client issues write requests to both the current service and the new service and issues read requests only to the new service.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1A:
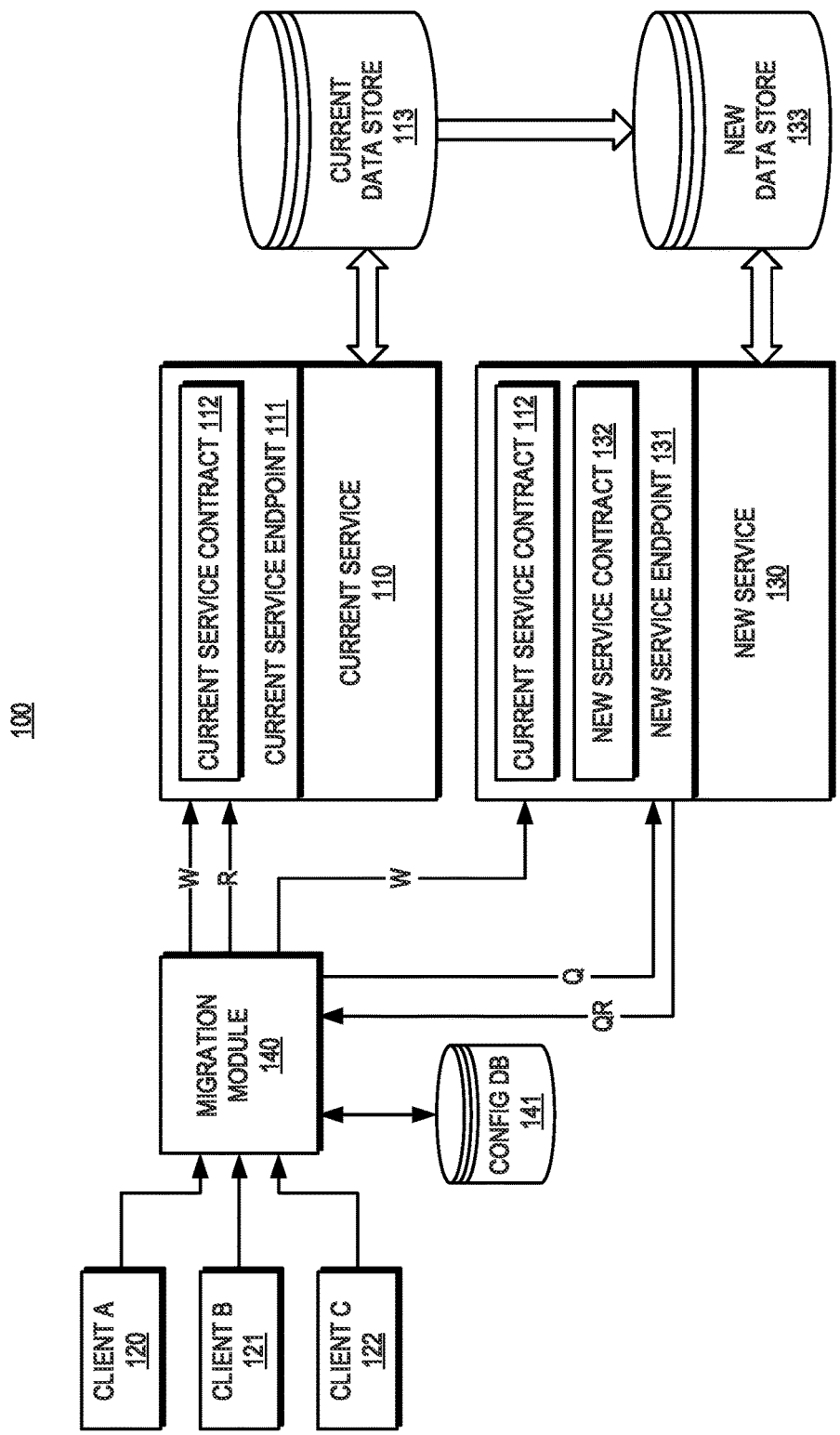
FIGS. 1A-C illustrate an embodiment of an exemplary service migration system that may implement aspects of the described subject matter.
Figure 1B:
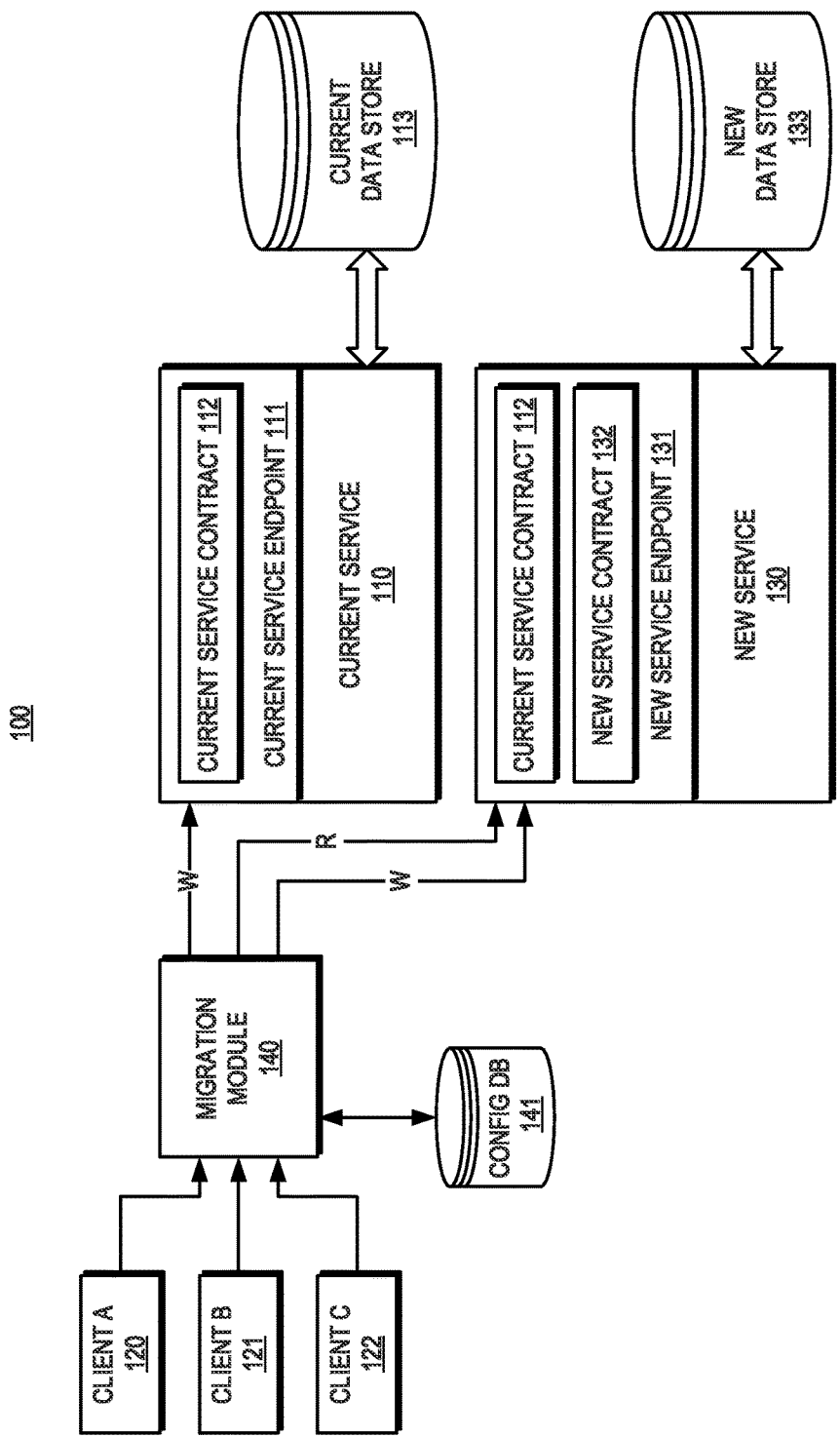
Figure 1C:
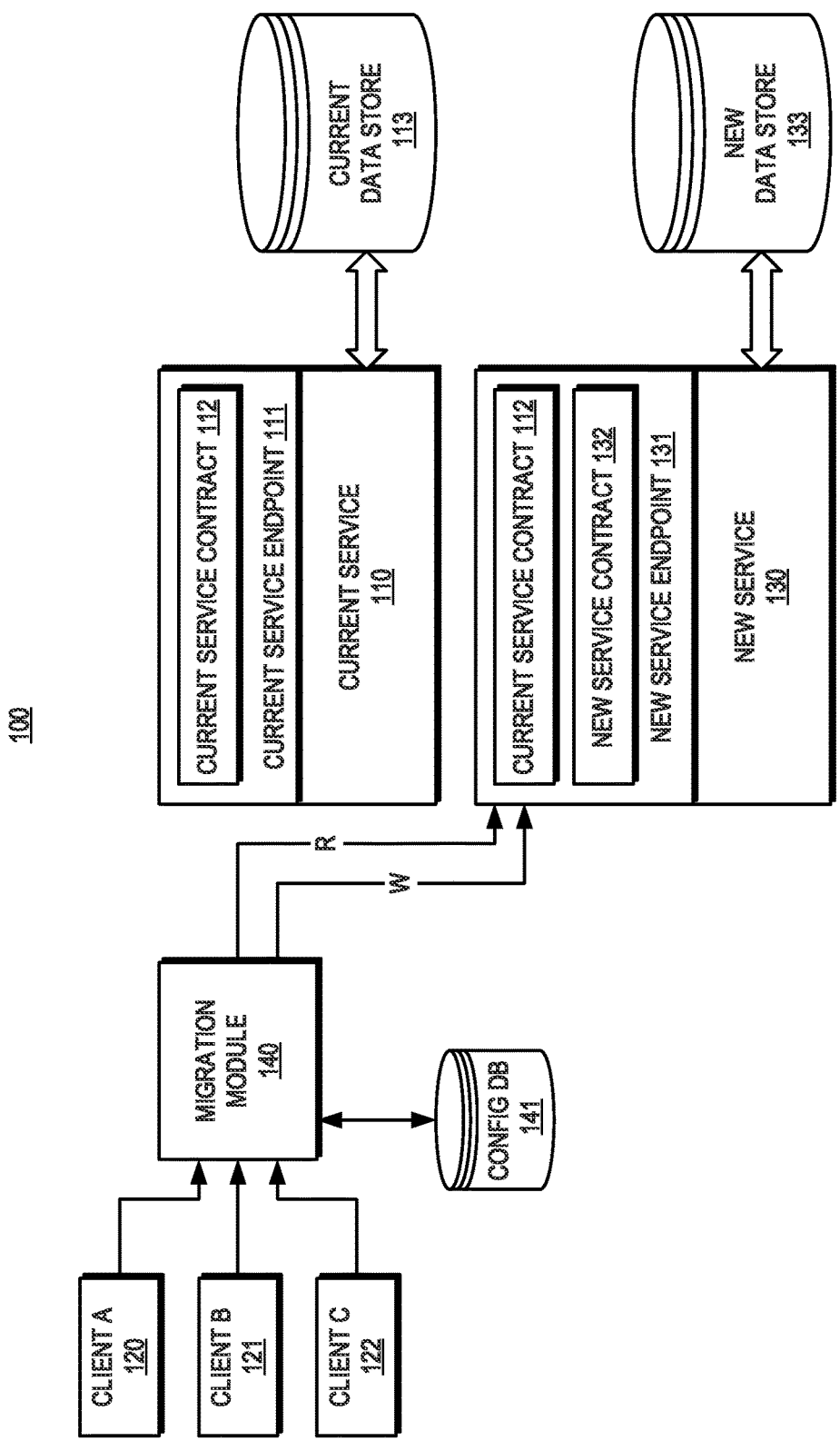

FIGS. 1A-C illustrate a service migration system 100 as an embodiment of an exemplary system that may implement aspects of the described subject matter. Embodiments of service migration system 100 may be described in the general context of "computer-executable instructions" that are executed to perform various steps, methods, and/or functionality in accordance with aspects of the described subject matter.

Computer-executable instructions may be embodied and/or implemented in various ways such as by a computer program (e.g., client program and/or server program), a software application (e.g., client application and/or server applications), software code, application code, source code, executable files, executable components, program modules, routines, application programming interfaces (APIs), functions, methods, objects, properties, data structures, data types, and/or the like.

Computer-executable instructions implemented by service migration system 100 may be executed, for example, by one or more computing devices and/or computer systems that may include one or more processors and storage devices (e.g., memory and disk drives) as well as various input devices, output devices, communication interfaces, and/or other types of devices. Computer-executable instructions implemented by service migration system 100, when executed by one or more processors, computing devices, and/or computer systems, may perform particular tasks or implement particular data types in accordance with aspects of the described subject matter. It is to be appreciated that service migration system 100, or portions thereof, may be implemented by software, hardware, firmware or a combination thereof in various embodiments.

As shown, service migration system 100 may include a current service 110. In an exemplary implementation, current service 110 may be a cloud-based service such as a web service or service application provided by a cloud platform. For example, a cloud platform may host various cloud-based services for customers (e.g., organizations, enterprises, business entities, corporate departments, etc.), and current service 110 may be one of such hosted cloud-based services. In some deployments, the cloud platform may provide a multi-tenant environment (e.g., multi-tenant network and/or multi-tenant farm) to which customers are assigned as tenants. Each different tenant of the multi-tenant environment may be customer having one or more users that are authorized to access certain cloud-based services which are provided to the tenant. Current service 110 may be accessible to all tenants, customers, and/or users of the multi-tenant environment or may be accessible to a subset of tenants, customers, or users.

Service migration system 100 may include one or more clients 120-122 that may call current service 110. Clients 120-122 may be implemented as various types of applications (e.g., client applications, web applications, customer applications, etc.), components, processes, and/or code capable of calling current service 110. Clients 120-122 may be different types of applications or processes that use current service 110 to provide data management operations that support the functionality of clients 120-122. As an example, one or more of clients 120-122 may be an application such as a communication application (e.g., e-mail application, web conferencing application, an instant messaging application, etc.), a productivity application (e.g., word processing application, a spreadsheet application, a slide show presentation application, a note-taking application, etc.), a calendar application, a file sharing application, and/or other type of application supported by current service 110. As another example, one or more of clients 120-122 may be implemented as a component, process, and/or code that provides functionality for setting up and managing tenants such as sign-in, authentication, user management, tenant administration, tenant provisioning, and/or other type of functionality supported by current service 110.

In various implementations, clients 120-122 may be hosted by a cloud platform. In a multi-tenant environment, for example, clients 120-122 may be hosted by a cloud platform with current service 110 within the same multi-tenant farm. When hosted by a cloud platform, clients 120-122 may be triggered and make calls to current service 110 in response to a remote user interacting with a user interface (e.g., portal, web page, web form, etc.), communication from a remote application (e.g., customer on-premises application, remote web application, user desktop or mobile application, etc.), and/or other remote commands. Alternatively or additionally, one or more of clients 120-122 may run on a user computing device and/or an on-premises customer machine and communicate with current service 110 over a network.

Current service 110 may provide an interface for use by clients 120-122 to consume current service 110. For example, current service 110 may expose a current service endpoint 111 or other suitable type of API for receiving write requests and read requests from one or more of clients 120-122. Current service endpoint 111 may specify an address (e.g., URL, URI, and/or other suitable network address) and a binding (e.g., HTTP, HTTPS, TCP, and/or other suitable transport protocol) for interacting with current service 110.

Current service 110 may expose a current service contract 112 via current service endpoint 111. Current service contract 112 may specify a set of methods that corresponds to operations supported by current service 110. For example, current service contract 112 may specify methods for retrieving properties and/or values, setting properties to values, removing properties, validating properties, and/or other functionality offered by current service 110. In some cases, current service contract 112 may provide a service-level agreement (SLA) regarding security and/or quality of service policies defined for current service 110.

Current service 110 may expose a Create, Read, Update and Delete (CRUD) interface via current service endpoint 111 and support CRUD operations according to current service contract 112. In some implementations, the operations supported by current service 110 and/or defined by current service contract 112 may be limited to idempotent CRUD operations that can be repeated and/or restarted and that provide the same result in response to the same operation (e.g., update) being called and/or performed multiple times.

Current service 110 may be configured to perform CRUD operations for managing service data that is stored in a current data store 113. In various implementations, current data store 113 may store relational (e.g., SQL) and/or non-relational (e.g., NO-SQL) service data using database storage, table storage, binary large object (blob) storage, file storage, queue storage, and/or other suitable type of storage mechanism. Current data store 113 may be associated with current service 110 and store various types of service data such as customer data, settings data, site data, message data, document data, and/or other type of content. In a multi-tenant environment, service data may be partitioned for each tenant to provide data isolation. Service data stored in current data store 113 may be replicated across multiple physical or virtual machines to improve availability, protect against failure, and support disaster recovery.

Current service 110 may be configured to perform CRUD operations on service data in current data store 113 in response to requests from one or more of clients 120-122. In general, current service 110 may retrieve service data in response to read requests, may create or update service data in response to write requests, and may remove service data in response to delete requests. The reading, writing, and deleting of service data (requested by clients 120-122 and/or performed by current service 110) may be idempotent so that the values for service data in current data store 113 remain correct and consistent in response to multiple requests for the same operation.

In various implementations, current service 110 may expose a Representational State Transfer (REST) interface. For instance, current service 110 may be implemented as a RESTful service and expose a CRUD/REST interface via current service endpoint 111. Clients 120-122 may issue RESTful HTTP requests for performing CRUD operations using idempotent GET, PUT, and DELETE HTTP commands. For example, clients 120-122 may issue a read request including an HTTP GET command to retrieve a stored entity, issue a write request including an HTTP PUT command to create and store data or to update stored data, and/or issue a delete request including an HTTP DELETE command to remove stored data. Requests from clients 120-122 may be constructed using various languages such JavaScript and C# and, in some cases, may be defined in accordance with the Open Data Protocol (OData) RESTful data access protocol. In some implementations, a request may pass an authentication token such as an Open Authorization (OAuth) token. Responses to requests may be received as HTML, XML, JSON, or other suitable format.

Service Migration

As shown, service migration system 100 may include a new service 130. In an exemplary implementation, new service 130 may be a new and/or updated version of current service 110 such as a new version of a current cloud-based service (e.g., web service or service application) provided by a cloud platform. Typically, new service 130 may provide additional functionality and/or a new user experience with respect to current service 110 and may be accessible to all clients, tenants, customers, and/or users that are capable of accessing current service 110. When implemented in a multi-tenant environment, new service 130 may be hosted by a cloud platform with current service 110 within the same multi-tenant farm.

Service migration from current service 110 (e.g., current version of a cloud-based service) to new service 130 (e.g., new version of the cloud-based service) may be performed to allow clients 120-122, customers, tenants, and/or users to switch from using current service 110 to using new service 130. Aspects of the described subject matter may maintain accessibility to service functionality during service migration with zero-downtime when switching from current service 110 to new service 130. In addition, switching from current service 110 to new service during service migration may be reversible and allow clients 120-122 to fall back to current service 110 without loss of data.

In various implementations, service migration may employ a dual-write/dual-read approach by configuring one or more clients 120-122 that interact with current service 110 to write data to both current service 110 and new service 130 and to initially read data from current service 110 and then switch to reading data from new service 130. During the entire process of service migration, clients 120-122 may continue to have access to the complete functionality offered by current service 110 with zero downtime. Even after a client switches to new service 130, the dual-write to current service 110 and new service 130 may continue until the client is completely satisfied with new service 130. Once completely satisfied, the client may then stop doing the dual-write and thereby "cut the cord" with current service 110. Each of clients 120-122 may decide when to migrate to new service 130 independently of when others are migrating and, at any time until the client decides to "cut the cord" and end the dual-write, the client can decide to fall back to current service 110.

While dual-write functionality may add some processing expense, additional writes are amortized over a period of time without substantial cost to the services. Furthermore, most service traffic involves reading data, which is not impacted. Moreover, the unit of write can be scoped down to how data is partitioned so that dual-writes involve writing very small pieces of data twice, not all client data. For example, dual-writes may involve writing an individual e-mail message or document and not an entire mailbox or document store.

Service migration in accordance with the described subject matter may implement various features that provide improved functionality over alternative approaches to service migration which do not enable such dual-write/dual-read capability. For example, one alternative approach to service migration could involve current service 110 replicating a full replica of data (e.g., using SQL log-replay) to new service 130, accumulating data changes in the current service 110 that are made by clients 120-122 during replication, and incrementally replicating data changes to new service 130 while the full replica is replicating. When the full replica finishes replicating to new service 130, current service 110 could place clients 120-122 into a read-only mode in which clients 120-122 can access and read data via current service endpoint 111 but cannot make any further data changes. While clients 120-122 are in the read-only mode, current service 110 could replicate any final accumulated data changes to new service 130 knowing that clients 120-122 are not generating further data changes. When the final accumulated changes have been replicated to new service 130, clients 120-122 could be switched to new service 130. After all clients 120-122 have migrated, current service 110 can be closed down.

A disadvantage of this alternative approach is that clients 120-122 necessarily have downtime and limited service functionality in order to prevent a loss of data. This alternative approach also does not allow clients 120-122 to go back to current service 110 after switching to new service 130 unless new service 130 explicitly supports and performs a totally new migration back to current service 110. Another disadvantage of this alternative approach is that migration requires a data migration tool or a specially orchestrated process in current service 110, which is distinct from current service contract 112 used by clients 120-122 during normal interaction with current service 110. A further disadvantage of this alternative approach is that new service 130 cannot decide to cancel or unship itself once one or more clients 120-122 have migrated to it. This alternative approach also cannot "flight" new service 130 for evaluation and, if there are problems, roll back new service 130 without disrupting clients 120-122. Service migration system 100 may implement various features that provide improvements which may address the above and/or other disadvantages of alternative approaches to service migration.

Publish New Service Endpoint

In accordance with aspects of the described subject matter, service migration may begin by publishing a new service endpoint 131 or other suitable type of API for new service 130. New service endpoint 131 may provide an interface that can be employed by clients 120-122 to call and consume new service 130. In various implementations, new service 130 may be implemented as a RESTful service and expose a CRUD/REST interface via new service endpoint 131. New service endpoint 111 may specify a different address and the same binding as current service endpoint 111.

New service 130 may expose a new service contract 132 via new service endpoint 131. New service contract 132 may specify a set of methods that correspond to operations supported by new service 130. In various implementations, new service contract 112 may provide enhanced functionality for clients 120-122 and include additional and/or different methods that those provided by current service contract 112. In some cases, new service contract 132 may provide a new SLA regarding security and/or quality of service policies defined for current service 110.

Along with offering new service contract 132, new service 130 may also expose and offer current service contract 112 via new service endpoint 131. By exposing current service contract 112 via new service endpoint 131, the set of methods and operations (e.g., idempotent CRUD operations) supported by current service 110 may be made available to clients 120-122 during service migration. For example, methods for retrieving properties and/or values, setting properties to values, removing properties, validating properties, and/or other functionality offered by current service 110 may be called by clients 120-122 via new service endpoint 131. At various stages of service migration, clients 120-122 may issue requests (e.g., read, write, and/or delete) to and/or otherwise consume new service 130 in accordance with the current service contract 112 and/or SLA defined for current service 110.

Ready-for-Migration Stage (Old-Write, Old-Read Mode)

Service migration system 100 may include a migration module 140 that may be utilized and/or implemented by clients 120-122 for performing service migration in accordance with aspects of the described subject matter. Migration module 140 may be implemented by code, an API, a client object model, a client library, a plug-in, an add-in, and/or other type of executable logic. Migration module 140 may be utilized and/or implemented by clients 120-122 in various ways. Migration module 140 (or components thereof) may be separate from and commonly and/or individually used by clients 120-122. Alternatively or additionally, migration module 140 (or components thereof) may be downloaded by, uploaded to, installed by, and/or otherwise included in one or more of clients 120-122. Migration module 140 may be implemented as a component of a cloud platform that is utilized by clients 120-122 and/or may be included in a client that is internal or external to the cloud platform. Migration module 140 may be implemented by a cloud platform with current service 110 and/or new service 130 within the same multi-tenant environment enabling clients 120-122 to drive service migration.

In various implementations, migration model 140 (e.g., code, API, client object model, client library, plug-in, add-in, executable logic, etc.) may be implemented and/or enabled for use by one or more of clients 120-122 for performing service migration from current service 110 to new service 130. Migration module 140 may enable, configure, instruct, and/or control one or more client 120-120 to begin service migration, transition to or from a particular stage of service migration, and/or complete service migration. When implemented and/or enabled for use, migration module 140 may configure, instruct, and/or control one or more of clients 120-122 to operate in a specific mode for performing certain operations during a particular stage of service migration. Migration module 140 may configure, instruct, and/or control one or more of clients 120-122 to transition to another stage of service migration and switch modes to perform different operations. It can be appreciated that, prior to beginning service migration, migration module 140 may not be implemented, enabled, and/or utilized by clients 120-122. Accordingly, clients 120-122 generally may issue requests (e.g., read, write, delete) only to current service endpoint 111 before migration module 140 is made available to begin the process of service migration.

Each of clients 120-122 for which migration module 140 is implemented and/or enabled may enter a ready-for-migration stage specific to each client. Clients 120-122 may enter the ready-for-migration stage on an individual basis and/or at the same time. Each of clients 120-122 may independently decide to implement and/or use migration module 140 to enter the ready-for migration stage. Alternatively or additionally, migration module 140 may enable and/or instruct one or more of clients 120-122 to enter the ready-for-migration stage.

Each of clients 120-122 in the ready-for migration stage may be ready to communicate with both current service endpoint 111 and new service endpoint 131, as opposed to just current service endpoint 111. While enabled for communication with current service endpoint 111 and new service endpoint 131, clients 120-122 may be configured and/or controlled via migration module 140 to operate in an old-write, old-read mode in which write requests and read requests are issued only to current service endpoint 111 during the ready-for migration stage. Accordingly, during the ready-for-migration stage, interactions by tenants and/or users that trigger one or more of clients 120-122 may result in and/or be handled by service data being written to and read from current service 110.

After being implemented and/or enabled by one or more of clients 120-122, migration module 140 may configure and/or control such one or more clients 120-122 to switch to various operating modes for performing certain actions in order migrate. Migration module 140 may determine modes and/or service migration stages for one or more of clients 120-122 based on various conditions (e.g., client conditions, service conditions, data storage/migration conditions, load balancing/network conditions, etc.) and/or commands (e.g., initiate, switch, throttle, revert, cancel, commit, etc.) from a client, service, tenant, user, system administrator, and/or cloud-services provider.

In some implementations, migration module 140 may check a configuration database 141 to determine a mode and/or service migration stage for one or more of clients 120-122. Configuration database 141 may store one or more flags and/or other suitable indicators that may be set (e.g., by a system administrator, cloud-services provider, etc. and/or based on conditions) to indicate a particular mode and/or service migration stage for one or more of clients 120-122. In some cases, configuration database 141 may include a global flag that may be set to indicate that all clients 120-122 (e.g., all clients in a multi-tenant farm) are to operate in a particular mode and/or transition to a certain service migration stage. Alternatively or additionally, configuration database 141 may include flags specific to each of clients 120-122 for indicating a mode and/or service migration stage for a particular client.

Migration module 140 may configure or instruct one or more of clients 120-122 to read from either current service 110 or new service 130 and to write to current service 110, new service 130, or both. For example, migration module 140 may configure or instruct one or more of clients 120-122 to operate in a selected mode that determines whether such one or more clients 120-122 should only write to and read from current service 110 (e.g., old-write, old-read mode), should write to both current service 110 and new service 130 and only read from current service 110 (e.g., dual-write, old-read mode), should write to both current service 110 and new service 130 and only read from new service 130 (e.g., dual-write, new-read mode), or should only write to and read from new service 130 (e.g., new-write, new-read mode).

In various implementations, migration module 140 may broker requests intended for current service 110 and/or new service 130. For example, migration module 140 may detect or receive a write request intended for current service 110 and issue and/or instruct a client to issue an additional write request to new service 130. Likewise, migration module 140 may detect or receive a write request intended for new service 130 and issue and/or instruct a client to issue an additional write request to current service 110.

Preliminary Stage (Dual-Write, Old-Read Mode)

To proceed with service migration in accordance with the described subject matter, one or more of clients 120-122 may transition from the ready-for-migration stage to a preliminary stage of service migration. In various implementations, migration module 140 may configure and/or instruct one or more of clients 120-122 to switch from an old-write, old-read mode to a dual-write, old-read mode in response to conditions, commands, and/or checking configuration database 141. Clients 120-122 may transition to the preliminary stage of service migration on an individual basis and/or at the same time.

FIG. 1A illustrates one or more clients 120-122 enabled by and/or that implement migration module 140 to operate in a dual-write, old-read mode during a preliminary stage of service migration. Each of clients 120-122 in the preliminary stage of service migration may be configured and/or instructed via migration module 140 to operate in a dual-write, old-read mode in which write requests are issued to both current service endpoint 111 and new service endpoint 131 and read requests are issued only to current service endpoint 111. In general, a write request to current service endpoint 111 will be followed by a write request to new service endpoint 131 which maintains data consistency and enables a client to fall back to current service 110 at any time before completing migration to new service 130. During the preliminary stage of service migration, new service 130 may handle write requests directed to new service endpoint 131 in accordance with the current service contract 112 and/or SLA defined for current service 110.

In the preliminary stage of service migration, service data from current data store 113 may be migrated to a new data store 133 associated with new service 130. For instance, service data for each of clients 120-122 operating in the dual-write, old-read mode may be migrated from current data store 113 to new data store 133 using a combination of replication and client-driven dual-write operations. During the replication of service data associated with each of clients 120-122 operating in the dual-write, old-read mode, one or more of such clients 120-122 may write newly created and/or updated service data to new service 130 for storage in new data store 133. When replication completes, the service data associated with each of clients 120-122 operating in the dual-write, old-read mode will be consistently maintained by both current data store 113 and new data store 133 since any service data created or changed during the preliminary stage of service migration is written to both current service 110 and new service 130. Accordingly, data migration for each of clients 120-122 operating in the dual-write, old-read mode may be effectuated without placing each of such clients 120-122 into a read-only mode and/or limiting service functionality. Furthermore, such data migration does not require a data migration tool or a specially orchestrated process in current service 110 and can be effectuated by leveraging current service contract 112.

In some scenarios, new service 130 may temporarily disable writing to new service endpoint 131 as to one or more clients 120-122 for throttling purposes. A client for which writing to new service endpoint 131 has been disabled may revert to or remain in the ready-for-migration stage and operate in the old-write, old-read mode. Since writing to current service 110 is not interrupted, service data written by the client while new service endpoint 131 is temporarily disabled continues to be preserved in current data store 113. When writing to new service endpoint 112 is re-enabled, service data written by the client to current service 110 during the time that new service endpoint 131 was temporarily disabled may be replicated from current data store 113 to new data store 133, and the client may return to or enter the preliminary stage of service migration and operate in the dual-write, old-read mode.

During the preliminary stage of service migration, interactions by tenants and/or users that trigger one or more of clients 120-122 may result in and/or be handled by service data being written to both current service 110 and new service 130 and service data being read only from current service 110. Each of clients 120-122 in the preliminary stage of service migration may consume the user experience of current service 110 by reading service data from current service 110 and current data store 113. Each of such clients 120-122 may create and update service data by writing to current service 110 for updating current data store 113. In various implementations, current service 110 may perform idempotent CRUD operations on current data store 113 in response to receiving RESTful HTTP read, write, and delete requests constructed using GET, PUT, and DELETE HTTP commands.

Each of clients 120-122 in the preliminary stage of service migration also may write service data to new service 130. For example, migration module 140 may issue and/or instruct a client to issue an additional write request to new service endpoint 131. New service 130 may store service data to new data store 133 in response to receiving write requests for creating and/or updating service data from one or more of clients 120-122. For example, new service 130 may perform idempotent create and update operations on new data store 133 in response to receiving write requests such as RESTful HTTP write requests constructed using a PUT HTTP command. The writing of service data performed by new service 130 may be idempotent so that the values for service data in new data store 133 remain correct and consistent in response to multiple requests for the same operation.

In the event that migration module 140 detects or receives a delete request intended for current service 110 to remove service data that has been replicated to new data store 133, migration module 140 may issue and/or instruct a client to issue an additional delete request (e.g., RESTful HTTP delete request) to new service 130. Migration module 140 may ignore delete requests issued to current service 110 to remove service data that has not been replicated to new data store 133.

Current data store 113 and new data store 133 may employ similar or different storage structures. In some implementations, current data store 113 may include a large database that contains service data for a set of tenants and/or users, and new data store 133 may include multiple, smaller databases with each smaller database being associated with a different subset of tenants and/or users. Accordingly, service migration may involve distributing migrated service data across multiple databases in new data store 133 to replace a large failure point with several smaller failure points so that fewer tenants and/or users would be impacted by a failure of a particular database. Service migration in accordance with aspects of the described subject matter may therefore improve the reliability and scalability of new service 130 as compared to current service 110.

New data store 133 may be newly-created storage for new service 130 or may be pre-existing storage. In some implementations, current data store 113 may contain a particular type of service data (e.g., settings data) for tenants and/or users that is to be migrated, and new data store 133 may be pre-existing storage that contains another type of data (e.g., site data, message data, document data, and/or other type of content) stored for tenants and/or users. Accordingly, service migration may involve associating migrated service data for a tenant and/or user with another type of data stored for such tenant and/or user so that migrated service data is more tightly coupled to the tenant and/or user. Additionally, migrated service data may be stored in new data store 133 with accompanying metadata that identifies the tenant and/or user and/or otherwise describes the migrated service data for facilitating access and retrieval. Service migration in accordance with aspects of the described subject matter may therefore store migrated service data more efficiently and/or provide easier access to migrated service data by new service 130 as compared to current service 110.

In some implementations, when a client writes service data associated with a particular tenant and/or user to current service endpoint 111, migration module 140 may query new service 130 before issuing and/or instructing the client to issue an additional write request to new service endpoint 131. For example, migration module 140 may send a query to new service 130 to inquire whether service data for the particular tenant and/or user exists in new data store 133. Migration module 140 may issue and/or instruct the client to issue the additional write request to new service endpoint 131 upon receiving a query response from new service 130 confirming that service data for the particular tenant and/or or user is stored in new data store 133.

Evaluation Stage (Dual-Write, New-Read Mode)

Proceeding further with service migration in accordance with the described subject matter, one or more of clients 120-122 may transition from the preliminary stage of service migration to an evaluation stage of service migration. In various implementations, migration module 140 may configure and/or instruct one or more of clients 120-122 to switch from a dual-write, old-read mode to a dual-write, new-read mode in response to conditions, commands, and/or checking configuration database 141. Clients 120-122 may transition to the evaluation stage of service migration on an individual basis and/or at the same time.

In the evaluation stage of service migration, service data may be consistently maintained by both current data store 113 and new data store 133. For instance, migration of service data for each of clients 120-122 previously operating in the dual-write, old-read mode may have completed such that identical service data may be read via either current service 110 or new service 130. In some implementations, migration module 140 may query new service 130 to confirm that replication of service data has completed before one or more of clients 120-122 switch to the dual-write, new-read mode.

FIG. 1B illustrates one or more clients 120-122 enabled by and/or that implement migration module 140 to operate in a dual-write, new-read mode during the evaluation stage of service migration. Each of clients 120-122 in the evaluation stage of service migration may be configured and/or instructed via migration module 140 to operate in a dual-write, new-read mode in which write requests are issued to both current service endpoint 111 and new service endpoint 131 and read requests are issued only to new service endpoint 131. As before, a write request to current service endpoint 111 will be followed by a write request to new service endpoint 131. During the evaluation stage of service migration, new service 130 may handle write requests and read requests directed to new service endpoint 131 in accordance with the current service contract 112 and/or SLA defined for current service 110.

During the evaluation stage of service migration, interactions by tenants and/or users that trigger one or more of clients 120-122 may result in and/or be handled by service data being written to both current service 110 and new service 130 and service data being read only from new service 130. Each of clients 120-122 in the evaluation stage of service migration may consume the user experience of new service 130 by reading service data from new service 130 and new data store 133. Each of such clients 120-122 may create and update service data by writing to new service 130 for updating new data store 133. In various implementations, new service 130 may perform idempotent CRUD operations on new data store 133 in response to receiving RESTful HTTP read, write, and delete requests constructed using GET, PUT, and DELETE HTTP commands.

Each of clients 120-122 in the evaluation stage of service migration also may write or delete service data to current service 110. For example, migration module 140 may issue and/or instruct a client to issue an additional write request or delete request to current service endpoint 111. Current service 110 may store or delete service data in current data store 113 in response to receiving such requests. Current service 110 may perform idempotent create, update, and delete operations on current data store 113 in response to receiving RESTful HTTP write requests and delete requests.

In some scenarios, new service 130 may temporarily disable reading from new service endpoint 131 as to one or more clients 120-122 for throttling purposes. A client for which reading from new service endpoint 131 has been disabled may revert to or remain in the preliminary stage of service migration and operate in the dual-write, old-read mode. Writing to current service 110 and new service 130 may continue while reading from new service endpoint 131 is temporarily disabled. When reading from new service endpoint 112 is re-enabled, the client may return to or enter the evaluation stage of service migration and operate in the dual-write, new-read mode.

During the evaluation stage of service migration, each of clients 120-122 may consume the user experience of new service 130 and decide whether to continue new service 130 or fall back to current service 110. For example, if a client is dissatisfied with new service 130, the client may fall back to the preliminary stage of service migration and switch from the dual-write, new-read mode to the dual-write, old-read mode. In some cases, the client may report problems and/or provide feedback to a system administrator and/or cloud-services provider. After reversing service migration, the client may read from current service 110 and continue writing to both current service 110 and new service 130. At a future time, the client may return to the evaluation stage of service migration and again operate in the dual-write, new-read mode. Service migration in accordance with aspects of the described subject matter may therefore allow one or more clients 120-122 that have switched to new service 130 to seamlessly fall back to current service 110 without loss of functionality or loss of data and without the need to perform a new data migration back to current service 110.

Alternatively or additionally, a system administrator and/or cloud-service provider may employ automated tools to evaluate the performance of new service 130 and decide whether new service 130 is to be maintained. For instance, the performance of new service 130 may be analyzed to determine whether new service 130 is meeting expectations and/or is experiencing problems. Furthermore, as current service 110 and new service 130 are concurrently available and support the same functionality, the performance of new service 130 may be compared against the performance of current service 110. For example, a side-by-side comparison of current service 110 and new service 130 may be performed when current data store 113 and new data store 133 employ different storage structures and/or mechanisms.

In the event new service 130 and/or new data store 133 have problems that are determined to be correctable, new service endpoint 131 may be temporarily disabled, and clients 120-122 may be switched to operate in the old-write, old-read mode. Clients 120-122 may continue to write to current service 110 while new service endpoint 131 is temporarily disabled. After the problems with new service 130 and/or new data store 133 are corrected, new service endpoint 131 may be re-enabled. Service data written by clients 120-122 to current service 110 during the time that new service endpoint 131 was temporarily disabled may be replicated from current data store 113 to new data store 133, and clients 120-122 may be switched to operate in the dual-write, new-read mode. Service migration in accordance with aspects of the described subject matter may therefore "flight" new service 130 for evaluation and, if there are problems, roll back new service 130 without disrupting clients 120-122. Accordingly, service migration in accordance with the described matter may expedite the development and release of software and/or cloud-based services. For example, new service 130 (e.g., a new version of a cloud-base service) may be released as soon as it can provide all operations supported by current service 110 (e.g., a prior version of the cloud-based service) and defined by the current service contract 112 (e.g., supported methods and/or SLA). New service 130 may be evaluated and refined over time to eventually support new service contract 132 (e.g., new methods and/or SLA).

If new service 130 and/or new data store 133 have problems that are determined to be pathological and/or otherwise fail to live up to expectations, service migration may proceed to a cancellation stage in which new service 130 is canceled and clients 120-122 are forced to operate in the old-write, old-read mode. In addition, during the cancellation stage, migration module 140 may be disabled so that clients 120-122 no longer have dual-write functionality. When all clients 120-122 are in the cancellation stage and operating in the old-write, old-read mode, new service endpoint 131 may be terminated. Clients 120-122 may issue write requests and read requests to current service endpoint 111 without the use of migration module 140 as they did prior to service migration and when they were unaware of new service endpoint 131. At some later point, new service 130 could be fixed and reintroduced by publishing a new or different service endpoint and making migration module 140 available again so that clients 120-122 may restart service migration and enter the ready-for-migration stage. Service migration in accordance with aspects of the described subject matter may therefore allow new service 130 to decide to cancel or unship itself after one or more clients 120-122 have migrated to it.

Committed Stage (New-Write, New-Read Mode)

When new service 130 meets expectations during the evaluation stage, new service 130 may be placed or may place itself into a fully available state in which it will not be terminated and all clients 120-122 eventually will fully migrate to new service 130. In such state, clients 120-122 can completely consume new service 130 and "cut the cord" to current service endpoint 111. In addition, brand new clients that have never used new service 130 can now onboard to new service endpoint 131. New service 130 may support new service contract 132 and SLA and can be considered "SHIPPED" or deployed.

One or more of clients 120-122 may transition from the evaluation stage of service migration to a committed stage of service migration. In various implementations, migration module 140 may configure and/or instruct one or more of clients 120-122 to switch from a dual-write, new-read mode to a new-write, new-read mode in response to conditions, commands, and/or checking configuration database 141. Clients 120-122 may transition to the committed stage of service migration on an individual basis and/or at the same time.

FIG. 1C illustrates one or more clients 120-122 enabled by and/or that implement migration module 140 to operate in a new-write, new-read mode during the committed stage of service migration. Each of clients 120-122 in the committed stage of service migration may be configured and/or instructed via migration module 140 to operate in a new-write, new-read mode in which write requests and read requests are issued only to new service endpoint 131. In various implementations, new service 130 may handle write requests and read requests directed to new service endpoint 131 during the committed stage of service migration in accordance with the current service contract 112 and/or SLA defined for current service 110.

During the committed stage of service migration, interactions by tenants and/or users that trigger one or more of clients 120-122 may result in and/or be handled by service data being written to and read from only new service 130. Each of clients 120-122 in the committed stage of service migration may consume the user experience of new service 130 by reading service data from new service 130 and new data store 133. Each of such clients 120-122 may create and update service data by writing only to new service 130 for updating new data store 133. In various implementations, new service 130 may perform idempotent CRUD operations on new data store 133 in response to receiving RESTful HTTP read, write, and delete requests constructed using GET, PUT, and DELETE HTTP commands.

In various implementations, after transitioning to the committed stage of service migration and switching to the new-write, new-read mode, a client may be prevented from returning to current service 110 and/or further use of current service endpoint 111. Each of clients 120-122 in the committed stage of service migration may validate that migration to new service 130 is successful and that all required service data is available in new data store 133. For example, each of such clients 120-122 may touch each piece of data it owns once either organically (e.g., slowly, steadily, over time) and/or or periodically (e.g., nightly).

When service migration to new service 130 is successful, a client may discard the memory of current service endpoint 111, disable and/or uninstall migration module 140, and consume new service 130 in accordance with new service contract 132 and/or SLA defined for new service 130. At this point, the client will issue write requests and read requests only to new service endpoint 131 without utilization of migration module 140 and/or otherwise behave as if it has only ever consumed new service 130. If migration module 140 is implemented for common use by clients 120-122, migration module 140 may be removed from service migration system 100 after all of clients 120-122 have successfully migrated to new service 130. When all clients 120-122 are consuming only new service endpoint 131 without utilization of migration module 140 and when no client is consuming current service endpoint 111, current service 110 and current service endpoint 111 may be terminated and service data from current data store 113 may be archived.

Exemplary Operating Environment

Figure 2:
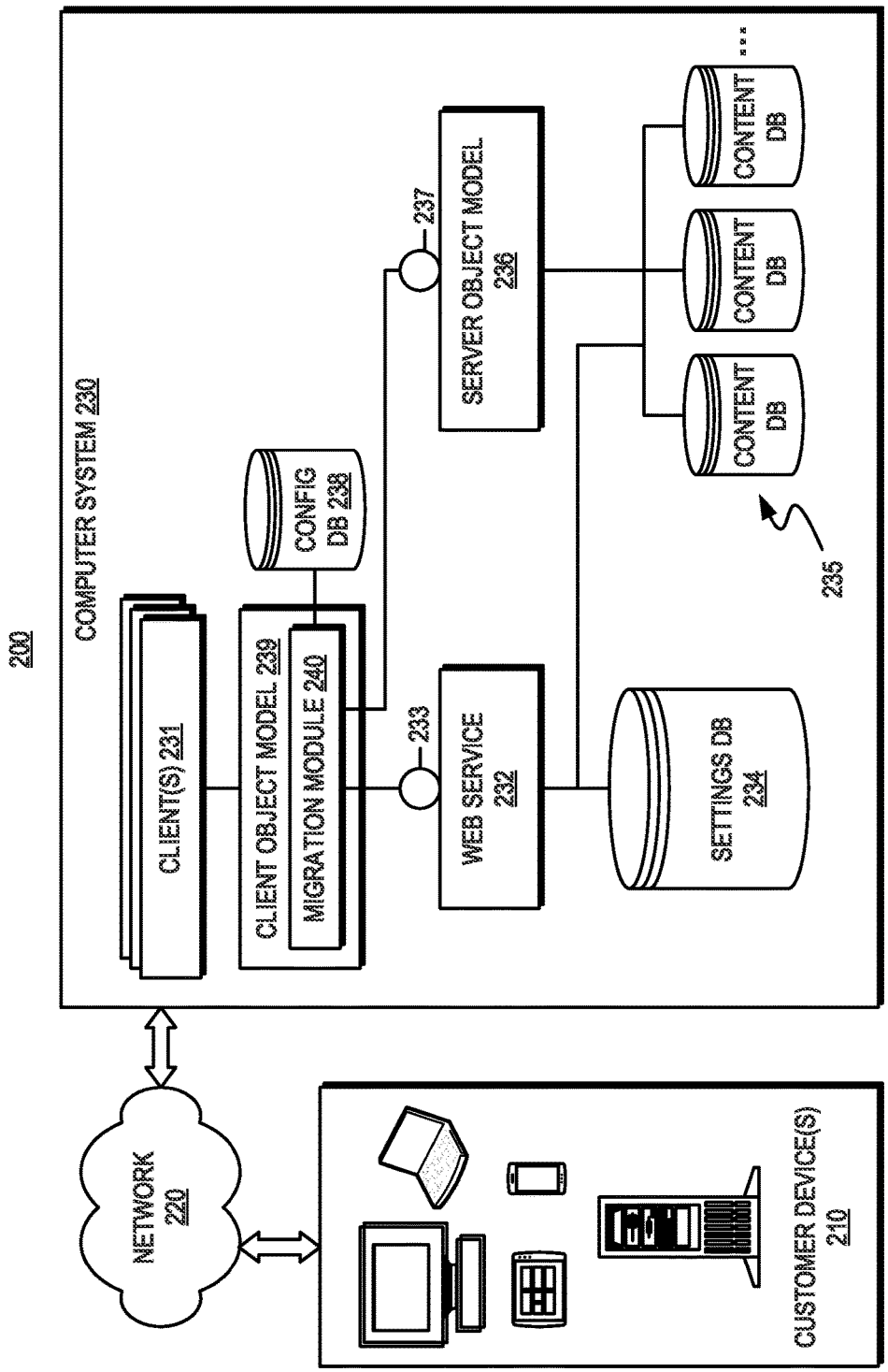
FIG. 2 illustrates an embodiment of an exemplary operating environment that may implement aspects of the described subject matter.

FIG. 2 illustrates an operating environment 200 as an embodiment of an exemplary operating environment that may implement aspects of the described subject matter. It is to be appreciated that aspects of the described subject matter may be implemented by various types of operating environments, computer networks, computer architectures, platforms, frameworks, computer systems, and/or computing devices.

Operating environment 200 may include customer device(s) 210 configured to communicate over a network 220 with a computer system 230. Customer device(s) 210 may be implemented by various types of user-facing computing devices such as a workstation or desktop computer, a laptop computer, a tablet device, a smartphone, and/or other type of computing device. Alternatively or additionally, customer device(s) 210 may be implemented by a server computer such as a physical, on-premises server computer of an enterprise.

Network 220 may be implemented by any type of network or combination of networks including, without limitation: a wide area network (WAN) such as the Internet, a local area network (LAN), a private network, a public network, a packet network, a circuit-switched network, a wired network, and/or a wireless network. Customer device(s) 210 and computer system 230 may communicate with each other via network 220 using various communication protocols (e.g., Internet communication protocols, WAN communication protocols, LAN communications protocols, and/or other network communication protocols) and authentication protocols (e.g., Kerberos authentication, NT LAN Manager (NTLM) authentication, Digest authentication, Single Sign-On (SSO) authentication, and/or other authentication protocols).

Computer system 230 may be implemented as distributed computing system in which components are located on different computing devices that are connected to each other through network (e.g., wired and/or wireless) and/or other forms of direct and/or indirect connections. Computer system 230 may include multiple computing devices such as server computers configured to implement various services in which one or more suitably-configured computing devices may perform one or more processing steps.

In various implementations, computer system 230 may be operated by a cloud-services provider and may support cloud-based services such as Infrastructure as a Service (IaaS), Software as a Service (SaaS), and/or Platform as a Service (PaaS). Cloud-based services may be provided using redundant and geographically dispersed datacenters with each datacenter including an infrastructure of physical servers. Computer system 230 may be implemented by physical servers of a datacenter that provide shared computing and storage resources to customers of cloud-based services. Physical servers of computer system 230 may host virtual machines having various roles for performing different tasks in conjunction with providing cloud-based services. Exemplary roles assigned and/or associated with a particular virtual machine may include, without limitation: web server, front end server, application server, database server (e.g., SQL server), domain controller, domain name server, directory server, and/or other types of virtual machine roles.

Computer system 230 may implement a cloud platform that provides various cloud-based services for customers such as organizations, enterprises, business entities, corporate departments, and so forth. The cloud platform may provide a multi-tenant environment for customers. In one implementation, for example, computer system 230 may be implemented as a multi-tenant farm within a network of virtual machines. Customers of cloud-based services may be assigned to the multi-tenant farm as tenants. Each tenant of the multi-tenant farm may be a customer having one or more users that are authorized to access the cloud-based services which are provided to the tenant.

As shown, computer system 230 may host client(s) 231 implemented, for example, as one or more clients (e.g., applications, components, processes, and/or code) that may be triggered in response to tenant and/or user interaction with customer device(s) 210 and/or a user interface (e.g., portal, web page, web form, etc.). Client(s) 231 may be accessed by multiple tenants and may provide functionality provided to all tenants of a multi-tenant farm such as tenant sign-in and authentication, tenant provisioning, and/or tenant administration, for example.

When triggered, client(s) 231 may call a web service 232 (e.g., cloud-based web service and/or service application) hosted by computer system 230. In various implementations, web service 232 may be configured to manage settings data for tenants of a multi-tenant farm in response to requests from client(s) 231. Web service 232 may publish and/or expose an interface 233 implemented, for example, as a CRUD/REST interface that can be used by client(s) 231 to call and consume web service 232. Interface 233 may expose a service contract (e.g., supported methods, SLA, etc.) defining the functionality offered by web service 232 to client(s) 231. Web service 232 may be configured to perform idempotent CRUD operations in response to receiving RESTful HTTP read, write, and/or delete requests constructed using GET, PUT, and DELETE HTTP commands.

Computer system 230 may host various relational and/or non-relational databases implemented, for example, by virtual machines and/or provided as a cloud-based database service. As shown, computer system 230 may host a settings database 234 containing settings data for a set of tenants (e.g., all tenants of a multi-tenant farm). Settings database 234 may be shared by the set of tenants and dedicated to storing only settings data for the set of tenants. Web service 232 may operate on settings data stored in settings database 234 in response to requests (e.g., read, write, and/or delete) from client(s) 231.

Computer system 230 also may host a plurality of content databases 235 for storing content data (e.g., site data, message data, document data, etc.) associated with tenants. Typically, each of content databases 235 may store content data for a different subset of tenants. Each of content databases 235 may include content data for multiple tenants as long as such tenants and their content data do not span multiple content databases. If any tenant requires more than one content database, that tenant will be the only tenant in such content databases. Accordingly, content databases 235 and tenants can be correlated.

Computer system 230 may host a server object model 236 configured to access content databases 235. In one exemplary implementation, computer system 230 may perform migration of clients 231 from web service 232 to server object model 236 and migration of settings data from settings database 234 to content databases 235. To support such migration, server object model 236 may publish and/or expose an interface 237 that implements the same service contract defined for web service 232 (and exposed by interface 233). In some cases, interface 237 may expose an additional service contract and/or additional methods corresponding to enhanced functionality provided by server object model 236. During migration, server object model 236 and/or interface 237 may be called to write settings data to and/or read settings data from content databases 235 in accordance with the service contract defined for web service 232.

Computer system 230 may include a configuration database 238 containing flags set to indicate whether clients 231 should only write to and read from web service 232 (e.g., old-write, old-read mode), should write to both web service 232 and server object model 236 and only read from web service 232 (e.g., dual-write, old-read mode), should write to both web service 232 and server object model 236 and only read from server object model 236 (e.g., dual-write, new-read mode), or should only write to and read from server object model 236 (e.g., new-write, new-read mode).

To initiate a preliminary stage of migration, a system administrator (or other component) of computer system 230 may set the flags in configuration database 238 to indicate that client(s) 231 should operate in the dual-write, old-read mode to write to both web service 232 and server object model 236 and only read from web service 232. Migration may involve a combination of replication and client-driven dual-write operations. Settings data for tenants may be replicated from settings database 234 to content databases 235 and, during replication, client(s) 231 may write newly created and/or updated settings data both to web service 232 and server object model 236. When replication completes, the settings data for tenants will be consistent and available via both database 234 and content databases 235 due to dual-write functionality. The system administrator (or other component) of computer system 230 may then initiate an evaluation stage of migration by setting the flags in configuration database 238 to indicate that client(s) 231 should operate in the dual-write, new-read mode to write to both web service 232 and server object model 236 and only read from server object model 236.

Client(s) 231 may utilize and/or implement a client object model 239 for communicating with web service 232. Client object model 239 may include and/or implement a migration module 240 configured to broker and/or issue requests to web service 232 and/or server object model 236. For example, migration module 240 may detect or receive write requests issued by client(s) 231, check the flags in configuration database 238 to determine an operating mode for client(s) 231, and issue and/or instruct clients 231 to issue additional write requests to server object model 236 or web service 233 based on the determined operating mode.

In a preliminary stage of migration, upon determining that client(s) 231 are to perform a dual-write to both web service 232 and server object model 236, migration module 240 may identify a tenant associated with the write request and query server object model 236 to inquire whether content data for the tenant exists in content databases 235. Server object model 236 may confirm the existence of content data for the tenant and/or may identify a particular content database associated with the tenant. After receiving a response from server object model 236, migration module 240 may issue and/or instruct a client to issue an additional write request to server object model 236 to store the settings data in the particular content database associated with the tenant. Migration module 240 may generate and/or store metadata that identifies the tenant and accompanies the settings data.

Migration of settings data from settings database 234 to content databases 235 may be accomplished in a manner that allows client(s) 131 to maintain full access to the functionality of web service 232 with zero-downtime and without placing client(s) 231, web service 232, or settings database 234 into a read-only mode. Settings data may be distributed from settings database 234 to content databases 235 to replace a single failure point with several smaller failure points so that fewer tenants and/or users would be impacted by a failure of a particular content database. Settings data also may be stored to content databases 235 so that the settings data for a tenant is tightly coupled to the tenant and/or content data of the tenant within a content database associated with the tenant. Additionally, settings data may be stored in content databases 235 with accompanying metadata that identifies the tenant and/or otherwise describes the settings data to facilitate access and retrieval.

Migration of clients 231 from web service 232 to server object model 236 also may be accomplished with zero-downtime to client(s) 131 by switching client(s) 231 to read from server object model 236 and leveraging the service contract of web service 232 to expose the full the functionality of web service 232 via interface 237. After client(s) 231 are switched to read from server object model 236, new and/or updated settings data may continue to be written to both settings database 234 and content databases 235 so that client(s) 231 may fall back to web service 232 if desired or necessary.

During an evaluation stage in which client(s) 231 operate in a dual-write, new-read mode, a system administrator of computer system 230 may evaluate the performance of server object model 236 and/or compare performances of web service 232 and server object model 236. Based on the evaluation, the system administration may temporarily disable and/or cancel server object model 236 and seamlessly switch client(s) 231 back to web service 232 until problems or issues with server object model 236 are resolved. When server object model 236 meets expectations, clients 231 may be switched to the new-write, new-read mode to consume only from server object model 236. After client(s) 231 successfully complete and/or validate migration to server object model 236, web service 232 and interface 232 may be taken down and settings database 234 may be archived.

Exemplary Processes

Figure 3:
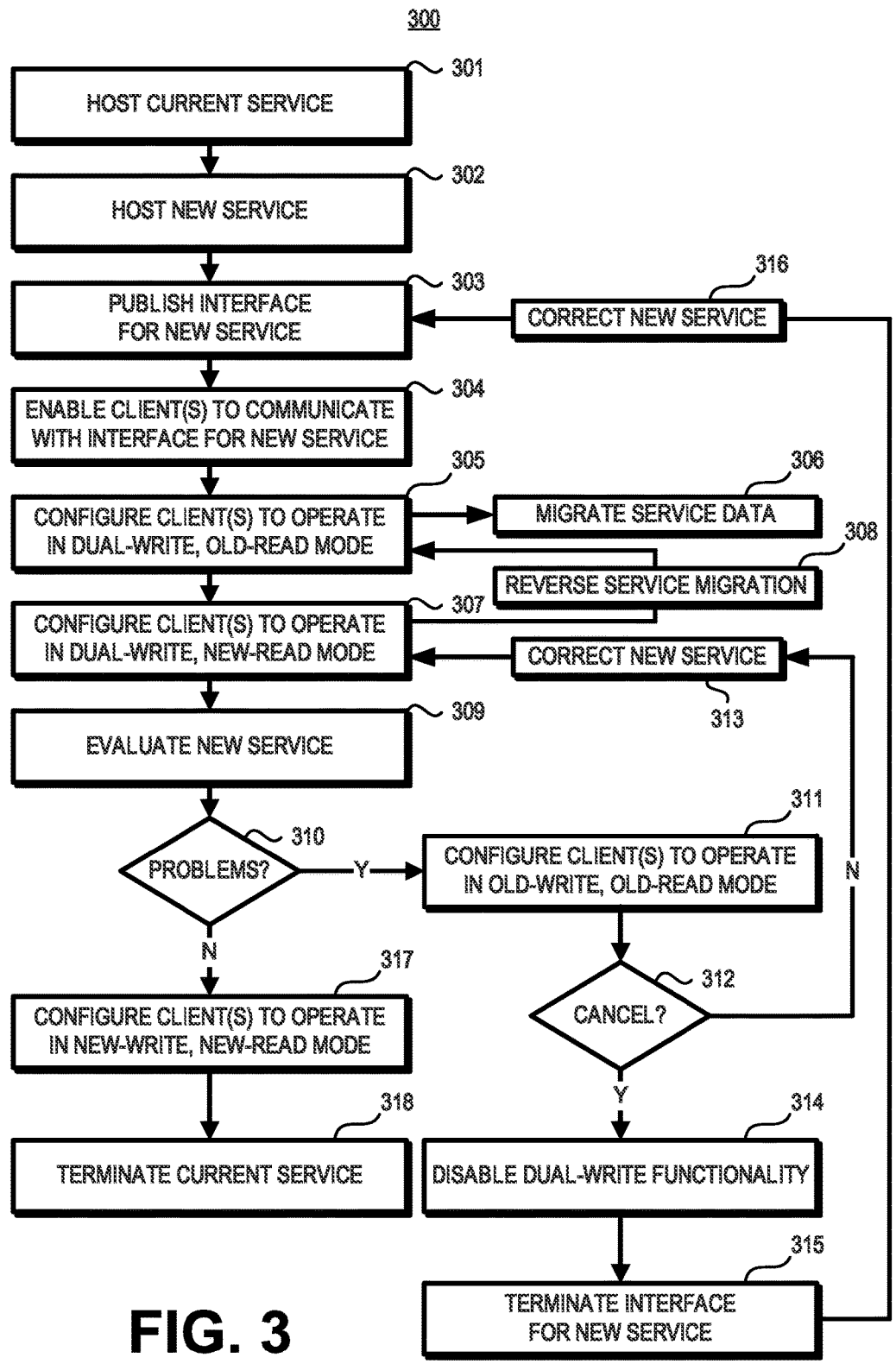
FIG. 3 illustrates an embodiment of an exemplary service migration process in accordance with aspects of the described subject matter.

FIG. 3 illustrates a computer-implemented method 300 as an embodiment of an exemplary service migration process in accordance with aspects of the described subject matter. Computer-implemented method 300, or portions thereof, may be performed by one or more computing devices, a computer system, computer-executable instructions, software, hardware, firmware or a combination thereof in various embodiments. For example, computer-implemented method 300 may be performed by a computer system having at least one processor.

At 301, a computer system may host a current service implemented, for example, as a cloud-based service, web service, and/or service application that is accessible to one or more clients. In some implementations, the one or more clients may be hosted by the computer system and may be triggered to call the current service in response to a remote user interacting with a web page. In other implementations, the one or more clients may be external to the computer system.

The current service may provide an interface (e.g., current service endpoint, API, CRUD interface, and/or REST interface, etc.) for receiving write requests and read requests from the one or more clients. The interface for the current service may expose a current service contract including a set of methods supported by the current service and/or a SLA defined for the current service. The current service may be configured to perform operations such as idempotent CRUD operations on a current data store (e.g., database) associated with the current service.

At 302, the computer system may host a new service to which the one or more clients are to be migrated. The new service may be implemented as a new version of the current service that provides additional functionality and/or a new user experience to the one or more clients. The new service may be configured to perform CRUD operations on a new data store associated with the current service. Service migration may involve migrating clients from the current service to the new service and migrating service data from the current data store to the new data store.

At 303, the computer system may publish an interface for the new service. The interface for the new service (e.g., new service endpoint, API, CRUD interface and/or REST interface, etc.) may be configured to receive write requests and read requests during various stages of service migration. The interface for the new service may expose the current service contract for the current service so that operations supported by the current service are fully available during service migration. The interface for the new service also may expose a new service contract that includes one or more different methods and/or a different SLA defined for the new service.

At 304, the computer system may enable one or more clients to communicate with the interface for the new service. For example, the computer system may provide a migration module (e.g., code, API, client object model, client library, plug-in, add-in, executable logic, etc.) that enables the one or more clients to communicate with both the current service and the new service to perform service migration. The migration module may be implemented as a component of the computer system and/or as a component of the one or more clients. The migration module may determine a mode and/or service migration stage for the one or more clients and may enable, configure, instruct, and/or control the one or more clients to begin service migration, transition to or from a particular stage of service migration, and/or complete service migration. In some implementations, the migration module may check a database (e.g., configuration database) and/or query new service to determine a mode and/or service migration stage for the one or more clients.

At 305, the computer system may configure the one or more clients to operate in a dual-write, old-read mode in which the one or more client issue write requests to both the interface for the current service and the interface for the new service and issue read requests only to the interface for the current service. The computer system may enable, configure, instruct, and/or control the one or more clients via the migration module, for example. The computer system may switch the one or more clients to operate in the dual-write, old-read mode from an old-write, old-read mode in which the one or more clients issue write requests and read requests only to the interface for the current service. The new service may handle write requests according to the service contract for the current service. The computer system may configure the one or more clients to operate in the dual-write, old-read mode so that new or updated service data is written to the new service while the one or more clients continue to consume the user experience of the current service.

At 306, the computer system may migrate service data. For example, service data may be migrated from a current data store associated with the current service to a new data store associated with the new service. Service data may be migrated using a combination of replication and client-driven dual-write operations so that write operations are performed on both the current data and the new data store during replication and so that the current data store and the new data store include consistent service data when replication completes. The new data store (e.g., new storage or existing storage that store a different type of service data) may include multiple databases for distributing service data so that one or more large failure points are replaced by multiple smaller failure points.

At 307, the computer system may configure the one or more clients to operate in a dual-write, new-read mode in which the one or more client issue write requests to both the interface for the current service and the interface for the new service and issue read requests only to the interface for the new service. The computer system may switch the one or more clients from operating in the dual-write, old-read mode to operate in the dual-write, new-read mode via the migration module, for example. The new service may handle write requests and read requests according to the service contract for the current service. The computer system may configure the one or more clients to operate in the dual-write, new-read mode after service data has completed replicating and is consistently available in the current data store and the new data store. The one or more clients may issue write request to the current service and the new service so that the current data store and the new data store continue to maintain consistent data and so that such clients may seamless fall back to the current service, if necessary or desired.

At 308, the computer system may reverse service migration in some scenarios. The computer system may switch the one or more clients from operating in the dual-write, new-read mode to fall back and operate in the dual-write, new-read mode via the migration module, for example. In some cases, the computer system may revert one or more of the clients to the dual-write, old-read mode for throttling purposes. In other cases, the computer system may reverse service migration to allow one or more of the clients to fall back to the dual-write, old-read mode in response to an indication that such one or more clients are dissatisfied with the current service.

At 309, the computer system may evaluate the new service. For example, the performance new service may be analyzed to determine whether the new service is meeting expectations. The computer system and/or a system administrator may evaluate the new service using automated tools, for example. In some cases, the performance of the current service and the performance of the new service may be compared. The computer system may "flight" the new service for evaluation and, if necessary, roll back the new service without disrupting the one or more clients.

At 310, the computer system may determine whether the current service is experiencing problems. The computer system and/or a system administrator may determine and/or detect problem with the current service based on the evaluation of the current service and/or feedback from the one or more clients. The computer system and/or a system administrator may determine corrective measures based on the severity of the problems.

At 311, the computer system may configure the one or more clients to operate in an old-write, old-read mode in which the one or more clients issue write requests and read requests only to the interface for the current service. When the new service is experiencing problems, for instance, the computer system may disable the interface for the new service and switch the one or more clients to the old-write, old-read mode so that problems with the new service can be analyzed and/or addressed. The computer system may switch the one or more clients from operating in the dual-write, new-read mode to operate in the old-write, old-read mode via the migration module, for example.

At 312, the computer system may determine whether to cancel the new service. The computer system may determine if the new service should be canceled based on whether the problems with the current service are correctable or pathological, for example. In some cases, the new service may decide whether to cancel or unship itself. If the problems with the current service are determined to be correctable, the computer system may temporarily disable the new service.

If, however, the problems with the current are severe and/or clients have rejected the current service, the computer system may determine that the new service is to be canceled.

At 313, the computer system may correct the new service. In some cases, the computer system may temporarily disable the interface for the new service and perform debugging and/or other corrective measure on the current service. The computer system may switch the one or more clients from operating in the old-write, old-read mode to operate in the dual-write, new-read mode via the migration module, for example. While the interface for the new service is temporarily disabled, the one or more clients may operate in the old-write, old-read mode and continue to write to the current service. After the problems with the new service are corrected, the computer system may enable the interface for the new service and replicate service data that was written by the one or more clients to the current service during the time that the interface for the new service endpoint was temporarily disabled from the current data store to the new data store.

At 314, the computer system may disable dual-write functionality. For example, if the new service is to be canceled, the computer system may disable and/or remove the migration module so that the one or more clients no longer have dual-write functionality. Without the use of the migration module, the clients may issue write requests and read requests only to the interface for the current service as they did prior to service migration.

At 315, the computer system may terminate the interface for the new service. For example, the computer system may terminate the interface for the new service when all clients have been forced to the old-write, old-read mode and no clients are consuming the new service. If the new service is fixed at some later point, the computer system may reintroduce the new service and then restart service migration.

At 316, the computer system may correct the new service. In some cases, the computer may perform debugging and/or other corrective measure on the current service so that the new service can be reintroduced to the one or more clients. The computer system may reintroduce the new service by publishing a new or different interface for the new service so that the one or more clients can communicate with new service and restart service migration.

At 317, the computer system may configure the one or more clients to operate in a new-write, new-read mode in which the one or more clients issue write requests and read requests only to the interface for the new service. When the new service meets expectations and/or the one or more clients are ready to commit to the new service, the computer system may switch the one or more clients from operating in the dual-write, new-read mode to operate in the new-write, new-read mode via the migration module, for example. The computer system may prevent the one or more clients from reversing service migration after committing to the new service. In some implementations, the new service may continue to handle read and write requests from the one or more clients in accordance with the current service contract for the current service until such clients validate that service migration is successful. For example, each client may touch all service data that it owns once to ensure availability. After the one or more clients have successfully migrated to the new service and have validated their service data, the new service may handle read and write requests from such clients in accordance with the new service contract for the new service.

At 318, the computer system may terminate the current service. When all clients are consuming only the interface for the new service endpoint and when no client is consuming the interface for the current service, the computer system may terminate the current service. For example, the computer system may discard the current service and the interface for the current service, disable and/or uninstall the migration module, and archive service data from the current data store. At this point, service migration is complete and each of the one or more clients will issue write requests and read requests only to the interface for the new service and behave as if it has only ever consumed the new service.

Figure 4:
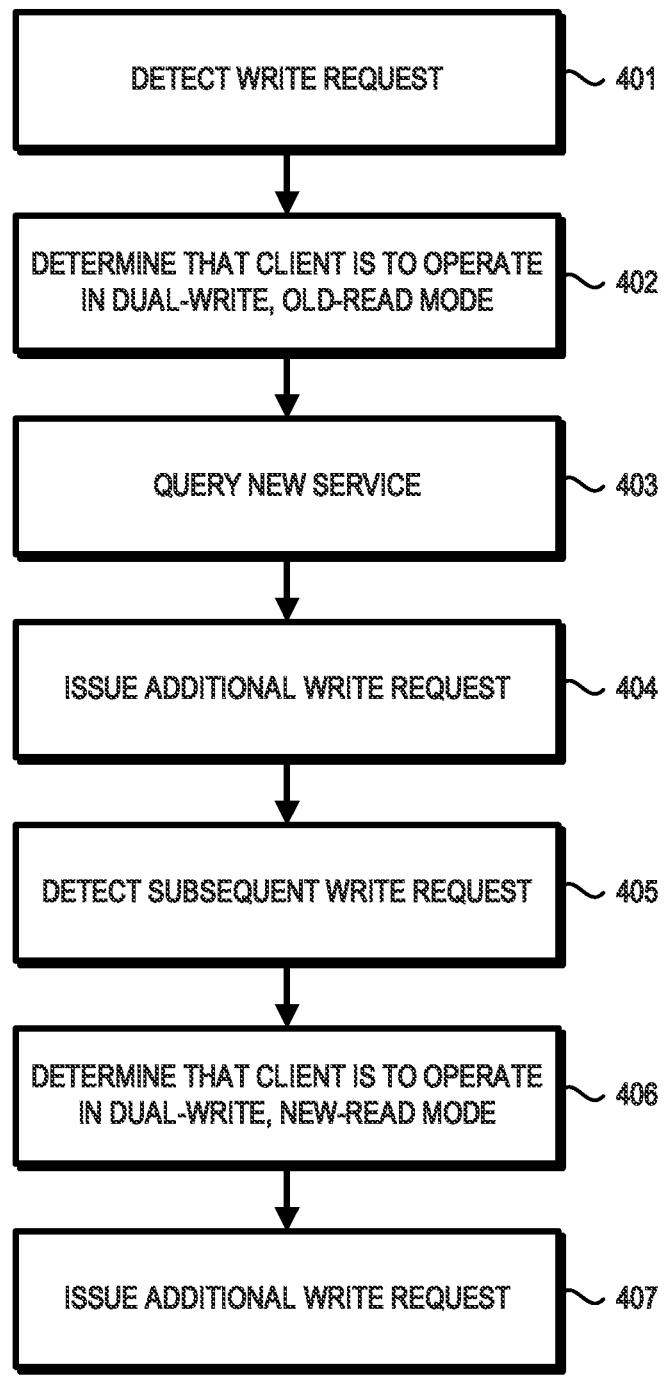
FIG. 4 illustrates an embodiment of an exemplary service migration process in accordance with aspects of the described subject matter.

FIG. 4 illustrates a computer-implemented method 400 as an embodiment of an exemplary service migration process in accordance with aspects of the described subject matter. Computer-implemented method 400, or portions thereof, may be performed by one or more computing devices, a computer system, computer-executable instructions, software, hardware, firmware or a combination thereof in various embodiments. For example, computer-implemented method 400 may be performed a computing device configured to execute computer-executable instructions that implement a migration module and are stored on one or more computer-readable storage media.

At 401, a computing device and/or migration module may detect a write request. For example, the computing device and/or migration module (e.g., code, API, client object model, client library, plug-in, add-in, executable logic, etc.) may detect a write request issued by a client for writing service data associated with a particular tenant to a current service. The migration module may be implemented as a component of a computer system and/or as a component of the client. The migration module may enable, configure, instruct, and/or control the client to begin service migration, transition to or from a particular stage of service migration, and/or complete service migration.

At 402, the computing device and/or migration module may determine that the client is to operate in a dual-write, old-read mode in which the client issues write requests to both the current service and a new service and issues read requests only to the current service. In some implementations, the computing device and/or migration module may check a database that stores flags indicating a particular mode for the client.

At 403, the computing device and/or migration module may send a query to the new service. For example, the computing device and/or migration module may query the new service to inquire whether service data associated with the particular tenant exists in a new data store associated the new service. In some implementations, the new data store may be existing storage containing a different type of service data. Alternatively or additionally, the new data store may include multiple databases with each database being associated with particular tenants.

At 404, the computing device and/or migration module may issue an additional write request for writing the service data associated with the particular tenant to the new service. The additional write request may be issued so that new or updated service data is written to the new service while the one or more clients continue to consume the user experience of the current service. The additional write request also may be issued while service data may is being migrated from a current data store associated with the current service to a new data store associated with the new service. In some implementations, the computing device and/or migration module may generate and store metadata that accompanies the service data and identifies the tenant for facilitating access and retrieval.

At 405, the computing device and/or migration module may detect a subsequent write request. For example, the computing device and/or migration module may detect a subsequent write request issued by the client for writing additional service data associated with the particular tenant to the new service. The subsequent write request may be detected after replication of service data to the new data store has completed and consistent service data is available in both the current data store and the new data store.

At 406, the computing device and/or migration module may determine that the client is to operate in a dual-write, new-read mode in which the client issues write requests to both the current service and the new service and issues read requests only to the new service. In some implementations, the computing device and/or migration module may check a database that stores flags indicating an updated mode for the client.

At 407, the computing device and/or migration module may issue an additional write request for writing the additional service data associated with the particular tenant to the current service. After service data has completed replicating and is consistently available in the current data store and the new data store, the additional write request may be issued so that the current data store and the new data store continue to maintain consistent data and so that the client may seamless fall back to the current service, if necessary or desired.

Exemplary Computing Device and/or Computer System

Aspects of the described subject matter may be implemented for and/or by various operating environments, computer networks, platforms, frameworks, computer architectures, and/or computing devices to provide service migration. Aspects of the described subject matter may be implemented by computer-executable instructions that may be executed by one or more computing devices, computer systems, and/or processors.

In its most basic configuration, a computing device and/or computer system may include at least one processing unit (e.g., single-processor units, multi-processor units, single-core units, and/or multi-core units) and memory. Depending on the exact configuration and type of computer system or computing device, the memory implemented by a computing device and/or computer system may be volatile (e.g., random access memory (RAM)), non-volatile (e.g., read-only memory (ROM), flash memory, and the like), or a combination thereof.

A computing devices and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter may be implemented by computer-executable instructions stored on one or more computer-readable storage media. Computer-executable instructions may be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device may provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device may be configured to receive and respond to input in various ways depending upon implementation. Responses may be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

A computing device may be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device may be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device may include and/or run one or more computer programs implemented, for example, by software, firmware, hardware, logic, and/or circuitry of the computing device. Computer programs may be distributed to and/or installed on a computing device in various ways. For instance, computer programs may be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device may include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device may include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device may include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system may be implemented by a computing device, such as a server computer, or by multiple computing devices configured to implement a service in which one or more suitably-configured computing devices may perform one or more processing steps. A computer system may be implemented as a distributed computing system in which components are located on different computing devices that are connected to each other through network (e.g., wired and/or wireless) and/or other forms of direct and/or indirect connections. A computer system also may be implemented via a cloud-based architecture (e.g., public, private, or a combination thereof) in which services are delivered through shared datacenters. Some components of a computer system may be disposed within a cloud while other components are disposed outside of the cloud.

Figure 5:
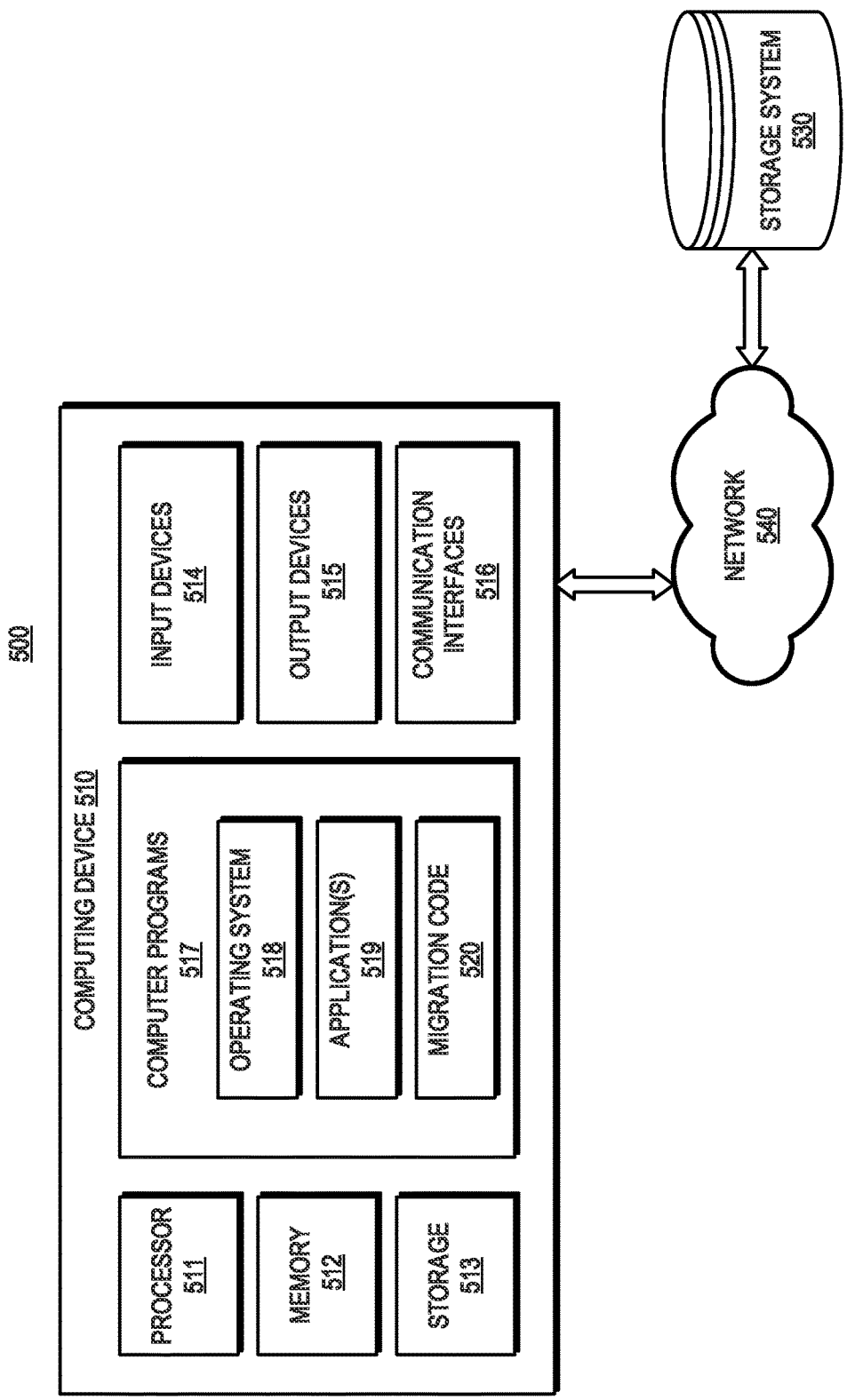
FIG. 5 illustrates an embodiment of an exemplary computer system that may implement aspects of the described subject matter.

FIG. 5 illustrates a computer system 500 as an embodiment of an exemplary computer system that may implement aspects of the described subject matter. As shown, computer system 500 may include a computing device 510 that is communicatively coupled to a storage system 530.

In various implementations, storage system 530 may be configured to store one or more types of data (e.g., service data, customer data, settings data, content data, site data, message data, document data, configuration data, etc.) and/or other types of data in accordance with aspects of the described subject matter. Storage system 530 may provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 530 may be implemented by one or more computing devices, such as a computer cluster in a datacenter, by virtual machines, and/or provided as a cloud-based storage service.

Computing device 510 may communicate with storage system 530 over a network 540 implemented by any type of network or combination of networks suitable for providing communication between computing device 510 and storage system 530. Network 540 may include, for example and without limitation: a WAN such as the Internet, a LAN, a private network, a public network, a packet network, a circuit-switched network, a wired network, and/or a wireless network. Computing device 510 and storage system 530 may communicate over network 340 using various communication protocols and/or data types. Alternatively or additionally, storage system 530 may be integrated with computing device 510.

Computing device 510 may include a processor 511 and memory 512. Computing device 510 also may include additional hardware storage 513. It is to be understood that computer-readable storage media includes memory 512 and hardware storage 513.

Computing device 510 may include input devices 514 and output devices 515. Input devices 314 may include one or more of the exemplary input devices described above and/or other type of input mechanism and/or device. Output devices 515 may include one or more of the exemplary output devices described above and/or other type of output mechanism and/or device.

Computing device 510 may contain one or more communication interfaces 516 that allow computing device 510 to communicate with other computing devices and/or computer systems over network 540. In various implementations, computing device 510 may employ communication interfaces 516 in the context of communicating over network 540 with storage system 530. Communication interfaces 516 also may be used in the context of distributing computer-executable instructions over network 540.

Computing device 510 may include and/or run one or more computer programs 517 implemented, for example, by software, firmware, hardware, logic, and/or circuitry of computing device 510. Computer programs 517 may include an operating system 518 implemented, for example, by one or more exemplary operating systems described above and/or other type of operating system suitable for running on computing device 510. Computer programs 517 may include one or more applications 519 implemented, for example, by one or more exemplary applications described above and/or other type of application suitable for running on computing device 510.

Computer programs 517 may be configured via one or more suitable interfaces (e.g., API or other data connection) to communicate and/or cooperate with one or more resources. Examples of resources include local computing resources of computing device 510 and/or remote computing resources such as server-hosted resources, cloud-based resources, online resources, remote data stores, remote databases, remote repositories, web services, web sites, web pages, web content, and/or other types of remote resources.

Computer programs 517 may implement computer-executable instructions that are stored in computer-readable storage media such as memory 512 or hardware storage 513, for example. Computer-executable instructions implemented by computer programs 517 may be configured to work in conjunction with, support, and/or enhance one or more of operating system 518 and applications 519. Computer-executable instructions implemented by computer programs 517 also may be configured to provide one or more separate and/or stand-alone services.

Computing device 510 and/or computer programs 517 may implement and/or perform various aspects of the described subject matter. As shown, computing device 510 and/or computer programs 517 may include migration code 520. In various embodiments, migration code 520 may include computer-executable instructions that are stored on a computer-readable storage medium and configured to implement one or more aspects of the described subject matter. By way of example, and without limitation, migration code 520 may implement one or more aspects of service migration system 100, migration module 140, migration module 240, computer-implemented method 300, and/or computer-implemented method 400. By way of further example, and without limitation, migration code 520 may be implemented by computing device 510 which, in turn, may be representative of various types of computing devices used to implement a client and/or a service in accordance with the described subject matter. Storage system 530 may be representative of various types of storage used to implement a data store and/or database in accordance with the described subject matter and, in some embodiments, may be integrated with computing device 510.

Figure 6:
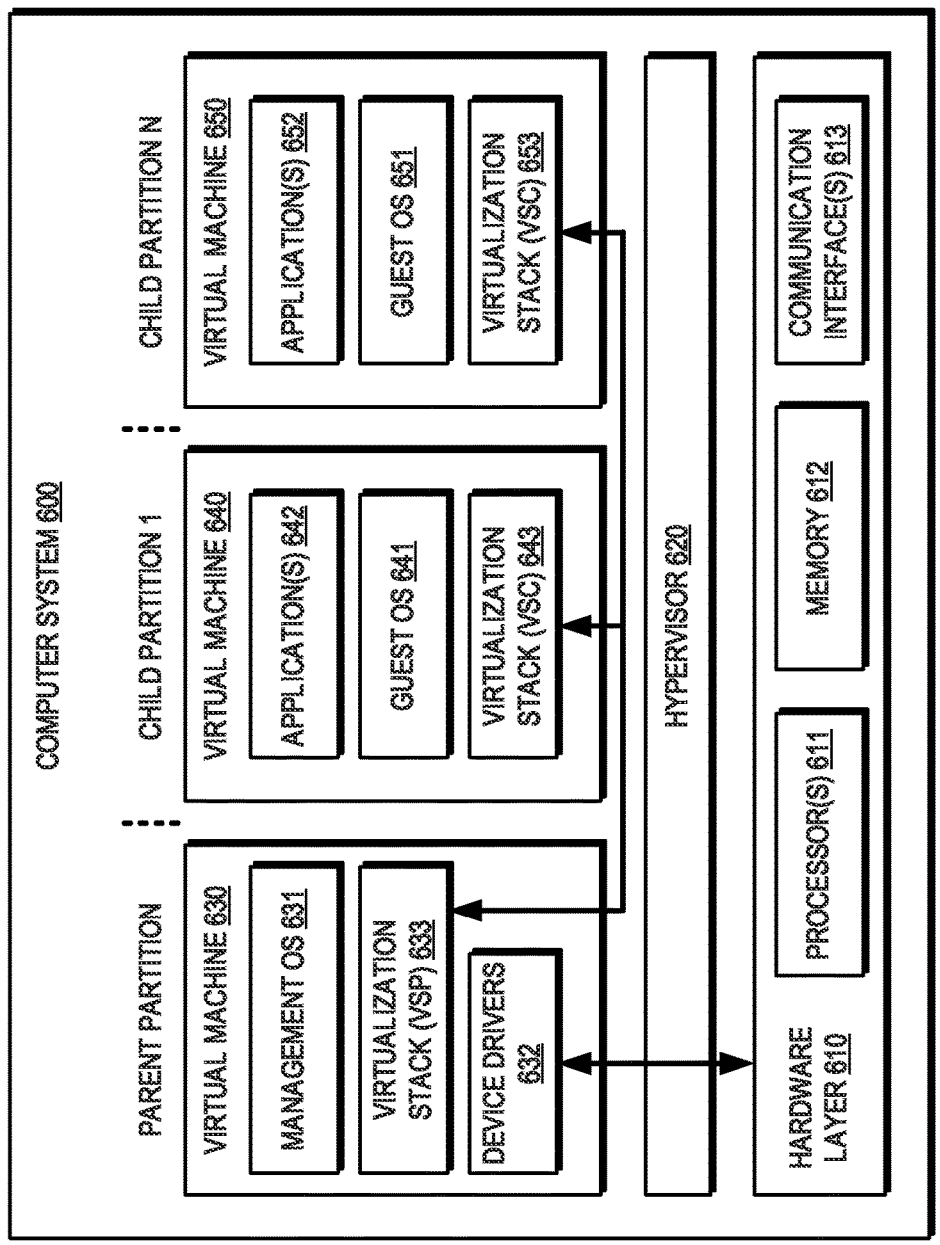
FIG. 6 illustrates an embodiment of an exemplary computer system that may implement aspects of the described subject matter.

FIG. 6 illustrates a computer system 600 as an embodiment of an exemplary computer system that may implement aspects of the described subject matter. In various implementations, deployment of computer system 600 and/or multiple deployments thereof may provide server virtualization for concurrently running multiple virtual servers instances on one physical host server computer and/or network virtualization for concurrently running multiple virtual network infrastructures on the same physical network.

Computer system 600 may be implemented by various computing devices such as one or more physical server computers that provide a hardware layer 610 which may include processor(s) 611, memory 612, and communication interface(s) 613. Computer system 600 may implement a hypervisor 620 configured to manage, control, and/or arbitrate access to hardware layer 610. In various implementations, hypervisor 620 may manage hardware resources to provide isolated execution environments or partitions such a parent (root) partition and one or more child partitions. A parent partition may operate to create one or more child partitions. Each partition may be implemented as an abstract container or logical unit for isolating processor and memory resources managed by hypervisor 620 and may be allocated a set of hardware resources and virtual resources. A logical system may map to a partition, and logical devices may map to virtual devices within the partition.

Parent and child partitions may implement virtual machines such as virtual machines 630, 640, and 650, for example. Each virtual machine may emulate a physical computing device or computer system as a software implementation that executes programs like a physical machine. Each virtual machine can have one or more virtual processors and may provide a virtual system platform for executing an operating system (e.g., a Microsoft® operating system, a Google® operating system, an operating system from Apple®, a Linux® operating system, an open source operating system, etc.). As shown, virtual machine 630 in parent partition may run a management operating system 631, and virtual machines 640, 650 in child partitions may host guest operating systems 641, 651 each implemented, for example, as a full-featured operating system or a special-purpose kernel. Each of guest operating systems 641, 651 can schedule threads to execute on one or more virtual processors and effectuate instances of application(s) 642, 652, respectively.

Virtual machine 630 in parent partition may have access to hardware layer 610 via device drivers 632 and/or other suitable interfaces. Virtual machines 640, 650 in child partitions, however, generally do not have access to hardware layer 610. Rather, such virtual machines 640, 650 are presented with a virtual view of hardware resources and are supported by virtualization services provided by virtual machine 630 in parent partition. Virtual machine 630 in parent partition may host a virtualization stack 633 that provides virtualization management functionality including access to hardware layer 610 via device drivers 632. Virtualization stack 633 may implement and/or operate as a virtualization services provider (VSP) to handle requests from and provide various virtualization services to a virtualization service client (VSC) implemented by one or more virtualization stacks 643, 653 in virtual machines 640, 650 that are operating in child partitions.

Computer system 600 may implement and/or perform various aspects of the described subject matter. By way of example, and without limitation, one or more aspects of service migration system 100, migration module 140, computer system 230, migration module 240, computer-implemented method 300, and/or computer-implemented method 400 may be implemented by virtual machines 640, 650 of computer system 600. By way of further example, and without limitation, one or more virtual machines 640, 650 may implement a client, a service, a data store, and/or a database in accordance with the described subject matter. In addition, hardware layer 610 may be implemented by one or more computing devices, such as computing device 510.

Supported Aspects

The detailed description provided above in connection with the appended drawings explicitly describes and supports various aspects of service migration in accordance with the described subject matter. By way of illustration and not limitation, supported aspects of service migration include a computer system for maintaining accessibility to service functionality during service migration, the computer system comprising: at least one processor configured to execute computer-executable instructions; and memory storing computer-executable configured to implement: a current service that exposes a current service contract for the current service; a new service that exposes the current service contract for the current service; and a migration module for enabling one or more clients to migrate from the current service to the new service by: controlling the one or more clients to operate in a dual-write, old-read mode in which the one or more clients issue write requests to both the current service and the new service and issue read requests only to the current service; switching the one or more clients from operating in the dual-write, old-read mode to operate in a dual-write, new-read mode in which the one or more clients issue write requests to both the current service and the new service and issue read requests only to the new service; and switching the one or more clients from operating in the dual-write, new-read mode to operate in a new-read, new-write mode in which the one or more clients issue write requests and read requests only to the new service.

Supported aspects of service migration include the forgoing computer system, wherein: the current service is a cloud-based service, and the new service is a new version of the cloud-based service.

Supported aspects of service migration include any of the forgoing computer systems, wherein the current service contract exposed by the current service and the new service supports only idempotent create, read, update, and delete operations.

Supported aspects of service migration include any of the forgoing computer systems, wherein: the new service further exposes a new service contract that includes one or more different methods than the current service contract for the current service.

Supported aspects of service migration include any of the forgoing computer systems, wherein: the migration module is implemented by a client object model, and the new service is implemented by a server object model.

Supported aspects of service migration include any of the forgoing computer systems, wherein: the computer system hosts the one or more clients, and the one or more clients are triggered to call the current service in response to a remote user interacting with a web page.

Supported aspects of service migration include an apparatus, a computer-readable storage medium, a computer-implemented method, and/or means for implementing any of the foregoing computer systems or portions thereof.

Supported aspects of service migration include a computing device for maintaining accessibility to service functionality during service migration, the computing device configured to: detect a write request issued by a client for writing service data associated with a particular tenant to a current service; determine that the client is to operate in a dual-write, old-read mode in which the client issues write requests to both the current service and a new service and issues read requests only to the current service; issue an additional write request for writing the service data associated with the particular tenant to the new service; detect a subsequent write request issued by the client for writing additional service data associated with the particular tenant to the new service; determine that the client is to operate in a dual-write, new-read mode in which the client issues write requests to both the current service and the new service and issues read requests only to the new service; and issue an additional write request for writing the additional service data associated with the particular tenant to the current service Supported aspects of service migration include the foregoing computing device, further configured to: check a database that stores flags indicating a particular mode for the client.

Supported aspects of service migration include any of the foregoing computing devices, further configured to: send a query to the new service to inquire whether service data associated with the particular tenant exists in a new data store associated the new service.

Supported aspects of service migration include a system, a computer-readable storage medium, a computer-implemented method, and/or means for implementing any of the foregoing computing devices or portions thereof.

Supported aspects of service migration include a computer-implemented method for maintaining accessibility to service functionality during service migration, the computer-implemented method comprising: hosting, by a computer system having at least one processor, a current service that provides an interface for receiving write requests and read requests from a client; hosting, by the computer system, a new service to which the client is to be migrated; publishing an interface for the new service; enabling, by the computer system, the client to communicate with the interface for the new service; configuring, by the computer system, the client to operate in a dual-write, old-read mode during a preliminary stage of service migration in which the client issues write requests to both the interface for the current service and the interface for the new service and issues read requests only to the interface for the current service; and configuring, by the computer system, the client to operate in a dual-write, new-read mode during an evaluation stage of service migration in which the client issues write requests to both the interface for the current service and the interface for the new service and issues read requests only to the interface for the new service.

Supported aspects of service migration include the foregoing computer-implemented method, wherein: the interface for current service exposes a current service contract for the current service, and the interface for the new service exposes the current service contract for the current service.

Supported aspects of service migration include any of the foregoing computer-implemented methods, wherein: the interface for the new service is a Representational State Transfer interface, and the current service contract supports only idempotent create, read, update, and delete operations.

Supported aspects of service migration include any of the foregoing computer-implemented methods, further comprising: migrating service data from a current data store associated with current service to a new data store associated with the new service when the client is operating in the dual-write, old-read mode.

Supported aspects of service migration include any of the foregoing computer-implemented methods, wherein: the current data store includes a database containing service data for a set of tenants, migrating service data comprises distributing the service data for the set of tenants across multiple databases included in the new data store, each of the multiple databases being associated with a different subset of tenants, and new or updated service data for a tenant is written to the new service and stored in the new data store within a particular database that is associated with the tenant in response the client issuing a write request to the interface for the new service.

Supported aspects of service migration include any of the foregoing computer-implemented methods, further comprising: switching, by the computer system, the client from operating in the dual-write, new-read mode to fall back to operating in the dual-write, old-read mode.

Supported aspects of service migration include any of the foregoing computer-implemented methods, further comprising: configuring, by the computer system, the client to operate in an old-write, old-read mode in which the client issues write requests and read requests only to the interface for the current service.

Supported aspects of service migration include any of the foregoing computer-implemented methods, wherein: the computer system configures the client to operate in the old-write, old-read mode in response to detecting a problem with the new service.

Supported aspects of service migration include any of the foregoing computer-implemented methods, further comprising: switching, by the computer system, the client from operating in the old-write, old-read mode to operate in the dual-write, new-read mode when the problem with the new service is corrected; and replicating service data that was written to the current service when the client was operating in old-write, old-read mode from a current data store associated with the current service to a new data store associated with the new service.

Supported aspects of service migration include any of the foregoing computer-implemented methods, further comprising: terminating, by the computer system, the interface for the new service.

Supported aspects of service migration include any of the foregoing computer-implemented methods, further comprising: configuring, by the computer system, the client operate in a new-write, new-read mode during a committed stage of service migration in which the client issues write requests and read requests only to the interface for the new service.

Supported aspects of service migration include a system, an apparatus, a computer-readable storage medium, and/or means for implementing and/or performing any of the foregoing computer-implemented methods or portions thereof.

It can be appreciated that features of service migration in accordance with the described embodiments provide various attendant and/or technical advantages. By way of illustration and not limitation, features of service migration in accordance with the described subject matter maintain accessibility to service functionality during service migration and provide a service platform with higher availability. During service migration, clients have continuous access to the complete functionality offered by a current service with zero downtime. For example, service data for clients can be migrated without placing clients, services, and data stores into a read-only mode and without limiting service functionality. Service data for clients can be migrated using a combination of replication and client-driven dual-write operations so that consistent service data is available in both the current service and the new service when replication completes. Furthermore, such data migration does not require a data migration tool or a specially orchestrated process in the current service and can be effectuated by leveraging the current service contract for the current service.

Features of service migration in accordance with aspects of the described subject matter allow a client to decide when to migrate to the new service independently of when other clients are migrating and allow the client to seamlessly fall back to the current service without loss of functionality or loss of data and without the need to perform a new data migration back to the current service. After a client switches to the new service, the dual-write operations to the current service and the new service continue so that the client can fall back to the current service if dissatisfied with the new service.

Features of service migration in accordance with aspects of the described subject matter improve the reliability and scalability of a new service. For example, service migration may involve distributing migrated service data across multiple databases to replace a large failure point with several smaller failure points so that fewer tenants and/or users would be impacted by a failure of a particular database.

Features of service migration in accordance with aspects of the described subject matter store migrated service data more efficiently and provide easier access to migrated service data by a new service. For example, service migration may involve associating migrated service data for a tenant and/or user with another type of data stored for such tenant and/or user so that migrated service data is more tightly coupled to the tenant and/or user. Additionally, migrated service data may be stored with accompanying metadata that identifies the tenant and/or user and/or otherwise describes the migrated service data for facilitating access and retrieval.

Features of service migration in accordance with aspects of the described subject matter expedite the development, release, and evaluation of a new service. For example, a service provider can "flight" a new service for evaluation and, if there are problems, roll back the new service without disrupting clients. A new version of a service can be released as soon as it can provide all operations supported by a prior version of the service and defined by the service contract for the prior version. The new service may be evaluated and refined over time to eventually support a new service contract and enhanced functionality. Furthermore, as the current service and the new service are concurrently available and support the same functionality, the performance of the new service can be compared against the performance of the current service. In addition, a new service can decide to cancel or unship itself even after clients have migrated to it.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer system for maintaining accessibility to service functionality during service migration, the computer system comprising:
   at least one processor configured to execute computer-executable instructions; and
   memory storing computer-executable instructions configured to implement:
   a current service that exposes a current service contract for the current service;
   a new service that exposes the current service contract for the current service; and
   a migration module that enables a client to migrate from the current service to the new service by:
   controlling the client to operate in a dual-write, old-read mode in which the client issues write requests to both the current service and the new service and issues read requests only to the current service;
   switching the client from operating in the dual-write, old-read mode to operate in a dual-write, new-read mode in which the client issues write requests to both the current service and the new service and issues read requests only to the new service;
   in response to detecting a problem with the new service, switching the client from operating in the dual-write, new read mode to operate in an old-write, old-read mode in which the client issues write requests and read requests only to the interface for the current service;
   when the problem with the new service is corrected, switching the client from operating in the old-write, old-read mode to operate in the dual-write, new-read mode;
   replicating service data that was written to the current service when the client was operating in the old-write, old-read mode from a current data store associated with the current service to a new data store associated with the new service; and
   switching the client from operating in the dual-write, new-read mode to operate in a new-read, new-write mode in which the client issues write requests and read requests only to the new service.

2. The computer system of claim 1, wherein:
   the current service is a cloud-based service, and
   the new service is a new version of the cloud-based service.

3. The computer system of claim 1, wherein the current service contract exposed by the current service and the new service supports only idempotent create, read, update, and delete operations.

4. The computer system of claim 1, wherein:
   the new service further exposes a new service contract that includes one or more different methods than the current service contract for the current service.

5. The computer system of claim 1, wherein:
the migration module is implemented by a client object model, and
the new service is implemented by a server object model.

6. The computer system of claim 1, wherein:
the computer system hosts the one or more clients, and
the one or more clients are triggered to call the current service in response to a remote user interacting with a web page.

7. A computer-implemented method for maintaining accessibility to service functionality during service migration, the computer-implemented method comprising:
hosting, by a computer system having at least one processor, a current service that provides an interface for receiving write requests and read requests from a client;
hosting, by the computer system, a new service to which the client is to be migrated, the new service providing an interface accessible to the client;
configuring, by the computer system, the client to operate in a dual-write, old-read mode during a preliminary stage of service migration in which the client issues write requests to both the interface for the current service and the interface for the new service and issues read requests only to the interface for the current service;
migrating, by the computer system, service data for a set of tenants from a current data store associated with the current service to a new data store associated with the new service when the client is operating in the dual-write, old-read mode, wherein:
the service data for the set of tenants from the current data store is distributed in the new data store across multiple databases associated with different subsets of tenants, and
new or updated service data for a tenant is written to the new service and stored in the new data store within a particular database that is associated with the tenant when the client issues a write request to the interface for the new service; and
configuring, by the computer system, the client to operate in a dual-write, new-read mode during an evaluation stage of service migration in which the client issues write requests to both the interface for the current service and the interface for the new service and issues read requests only to the interface for the new service.

8. The computer-implemented method of claim 7, wherein:
the interface for the current service exposes a current service contract for the current service, and
the interface for the new service exposes the current service contract for the current service.

9. The computer-implemented method of claim 8, wherein:
the interface for the new service is a Representational State Transfer interface, and
the current service contract supports only idempotent create, read, update, and delete operations.

10. The computer-implemented method of claim 7, further comprising:
switching, by the computer system, the client from operating in the dual-write, new-read mode to fall back to operating in the dual-write, old-read mode.

11. The computer-implemented method of claim 7, further comprising:
configuring, by the computer system, the client to operate in a new-write, new-read mode during a committed stage of service migration in which the client issues write requests and read requests only to the interface for the new service.

12. A computer-implemented method for maintaining accessibility to service functionality during service migration, the computer-implemented method comprising:
hosting, by a computer system having at least one processor, a current service that provides an interface for receiving write requests and read requests from a client;
hosting, by the computer system, a new service to which the client is to be migrated, the new service providing an interface accessible to the client;
configuring, by the computer system, the client to operate in a dual-write, old-read mode during a preliminary stage of service migration in which the client issues write requests to both the interface for the current service and the interface for the new service and issues read requests only to the interface for the current service;
configuring, by the computer system, the client to operate in a dual-write, new-read mode during an evaluation stage of service migration in which the client issues write requests to both the interface for the current service and the interface for the new service and issues read requests only to the interface for the new service;
configuring, by the computer system in response to detecting a problem with the new service, the client to operate in an old-write, old-read mode in which the client issues write requests and read requests only to the interface for the current service;
switching, by the computer system, the client from operating in the old-write, old-read mode to operate in the dual-write, new-read mode when the problem with the new service is corrected; and
replicating service data that was written to the current service when the client was operating in old-write, old-read mode from a current data store associated with the current service to a new data store associated with the new service.

13. The computer-implemented method of claim 12, further comprising:
configuring, by the computer system, the client operate in a new-write, new-read mode during a committed stage of service migration in which the client issues write requests and read requests only to the interface for the new service.

14. The computer-implemented method of claim 13, wherein:
prior to the committed stage of service migration, the computer system can configure the client to fall back to operating in the dual-write, old-read mode.

15. The computer-implemented method of claim 12, wherein:
the interface for the current service exposes a current service contract for the current service, and
the interface for the new service exposes the current service contract for the current service.

16. The computer-implemented method of claim 15, wherein:
the current service contract supports only idempotent create, read, update, and delete operations.

17. The computer-implemented method of claim 12, wherein:
the interface for the new service is a Representational State Transfer interface.

18. The computer-implemented method of claim 12, wherein:
   the current service is a cloud-based service, and
   the new service is a new version of the cloud-based service.

19. The computer-implemented method of claim 12, further comprising:
   migrating service data from the current data store associated with the current service to the new data store associated with the new service when the client is operating in the dual-write, old-read mode.

20. The computer-implemented method of claim 19, wherein:
   service data for a set of tenants that is stored in the current data store is distributed in the new data store across multiple databases that are associated with different subsets of tenants, and
   new or updated service data for a tenant is written to the new service and stored in the new data store within a particular database that is associated with the tenant when the client issues a write request to the interface for the new service.

* * * * *